United States Patent [19]
Ikeda et al.

[11] Patent Number: 6,057,946
[45] Date of Patent: *May 2, 2000

[54] TONALITY CORRECTION SYSTEM

[75] Inventors: Yuichi Ikeda, Tokyo; Nobuatsu Sasanuma, Yokohama; Tetsuya Atsumi, Tokyo; Tetsuya Nakamura; Tsunao Honbo, both of Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/781,060

[22] Filed: Jan. 9, 1997

[30] Foreign Application Priority Data

Jan. 19, 1996 [JP] Japan .................................. 8-007633
Nov. 20, 1996 [JP] Japan .................................. 8-309265

[51] Int. Cl.$^7$ ........................................................ G03F 3/08
[52] U.S. Cl. ............................. 358/518; 358/1.9; 358/298
[58] Field of Search .................................. 382/167, 162; 358/500–504, 298–300, 445–458, 494, 529, 530, 518–521, 534, 538, 1.9

[56] References Cited

U.S. PATENT DOCUMENTS

| | | |
|---|---|---|
| 4,067,009 | 1/1978 | Constant .................................. 342/25 |
| 4,642,681 | 2/1987 | Ikeda ....................................... 358/529 |
| 4,847,654 | 7/1989 | Honma et al. .......................... 358/300 |
| 4,873,428 | 10/1989 | Takeuchi et al. ................. 250/214 DC |
| 5,081,528 | 1/1992 | Hayashi et al. ......................... 358/501 |
| 5,239,383 | 8/1993 | Ikeda et al. ............................. 358/300 |
| 5,363,208 | 11/1994 | Ogino et al. ............................ 358/445 |
| 5,365,316 | 11/1994 | Motoyama et al. ...................... 399/88 |
| 5,381,248 | 1/1995 | Ikeda et al. ............................. 358/538 |
| 5,450,212 | 9/1995 | Asada ...................................... 358/445 |
| 5,469,266 | 11/1995 | Usami et al. ........................... 358/298 |
| 5,572,330 | 11/1996 | Sasanuma ................................ 358/298 |

*Primary Examiner*—Leo H. Boudreau
*Assistant Examiner*—Ishrat Sherali
*Attorney, Agent, or Firm*—Fitzpatrick, Cella, Harper & Scinto

[57] ABSTRACT

An image processing apparatus and method which inputs multivalued image data capable of m-level representation, performs image processing on the input data, and converts the processed data into multivalued image data capable of n-level (m<n) tonality. Upon forming an image on a print medium based on input image data, the image is formed such that the difference between an image density $D(x)$ of the image formed on a print medium at a tonality level x and an image density $D(x+1)$ of an image formed on the print medium at the next tonality level x+1 satisfies $D(x+1) - D(x) \leq A \times D(x)$ ($A \leq 0.08$) ($A \leq 0.08$). Further, a pattern signal having a rectified sine wave having a predetermined period is generated, and a pulse-width modulated signal for generating a beam is generated by performing pulse-width modulation on the input image data based on the pattern signal.

30 Claims, 21 Drawing Sheets

PSEUDO OUTLNE

FIG. 14

| 8bit | 10bit | 8bit | 10bit | 8bit | 10bit | 8bit | 10bit | 8bit | 10bit | 8bit | 10bit | 8bit | 10bit | 8bit | 10bit |
|---|---|---|---|---|---|---|---|---|---|---|---|---|---|---|---|
| 0 | 0 | 32 | 32 | 64 | 64 | 96 | 145 | 128 | 258 | 160 | 403 | 192 | 580 | 224 | 789 |
| 1 | 1 | 33 | 33 | 65 | 66 | 97 | 148 | 129 | 262 | 161 | 408 | 193 | 586 | 225 | 796 |
| 2 | 2 | 34 | 34 | 66 | 69 | 98 | 151 | 130 | 266 | 162 | 413 | 194 | 592 | 226 | 804 |
| 3 | 3 | 35 | 35 | 67 | 71 | 99 | 154 | 131 | 270 | 163 | 418 | 195 | 598 | 227 | 811 |
| 4 | 4 | 36 | 36 | 68 | 73 | 100 | 157 | 132 | 274 | 164 | 423 | 196 | 604 | 228 | 818 |
| 5 | 5 | 37 | 37 | 69 | 75 | 101 | 160 | 133 | 278 | 165 | 428 | 197 | 611 | 229 | 825 |
| 6 | 6 | 38 | 38 | 70 | 77 | 102 | 164 | 134 | 282 | 166 | 434 | 198 | 617 | 230 | 832 |
| 7 | 7 | 39 | 39 | 71 | 79 | 103 | 167 | 135 | 287 | 167 | 439 | 199 | 623 | 231 | 839 |
| 8 | 8 | 40 | 40 | 72 | 82 | 104 | 170 | 136 | 291 | 168 | 444 | 200 | 629 | 232 | 847 |
| 9 | 9 | 41 | 41 | 73 | 84 | 105 | 173 | 137 | 295 | 169 | 449 | 201 | 636 | 233 | 854 |
| 10 | 10 | 42 | 42 | 74 | 86 | 106 | 177 | 138 | 300 | 170 | 455 | 202 | 642 | 234 | 861 |
| 11 | 11 | 43 | 43 | 75 | 88 | 107 | 180 | 139 | 304 | 171 | 460 | 203 | 648 | 235 | 869 |
| 12 | 12 | 44 | 44 | 76 | 91 | 108 | 184 | 140 | 308 | 172 | 465 | 204 | 655 | 236 | 876 |
| 13 | 13 | 45 | 45 | 77 | 93 | 109 | 187 | 141 | 313 | 173 | 471 | 205 | 661 | 237 | 884 |
| 14 | 14 | 46 | 46 | 78 | 96 | 110 | 190 | 142 | 317 | 174 | 476 | 206 | 668 | 238 | 891 |
| 15 | 15 | 47 | 47 | 79 | 98 | 111 | 194 | 143 | 322 | 175 | 482 | 207 | 674 | 239 | 899 |
| 16 | 16 | 48 | 48 | 80 | 101 | 112 | 197 | 144 | 326 | 176 | 487 | 208 | 681 | 240 | 906 |
| 17 | 17 | 49 | 49 | 81 | 103 | 113 | 201 | 145 | 331 | 177 | 493 | 209 | 687 | 241 | 914 |
| 18 | 18 | 50 | 50 | 82 | 106 | 114 | 204 | 146 | 335 | 178 | 498 | 210 | 694 | 242 | 921 |
| 19 | 19 | 51 | 51 | 83 | 108 | 115 | 208 | 147 | 340 | 179 | 504 | 211 | 700 | 243 | 929 |
| 20 | 20 | 52 | 52 | 84 | 111 | 116 | 212 | 148 | 345 | 180 | 510 | 212 | 707 | 244 | 937 |
| 21 | 21 | 53 | 53 | 85 | 114 | 117 | 215 | 149 | 349 | 181 | 515 | 213 | 714 | 245 | 944 |
| 22 | 22 | 54 | 54 | 86 | 116 | 118 | 219 | 150 | 354 | 182 | 521 | 214 | 720 | 246 | 952 |
| 23 | 23 | 55 | 55 | 87 | 119 | 119 | 223 | 151 | 359 | 183 | 527 | 215 | 727 | 247 | 960 |
| 24 | 24 | 56 | 56 | 88 | 122 | 120 | 227 | 152 | 363 | 184 | 533 | 216 | 734 | 248 | 968 |
| 25 | 25 | 57 | 57 | 89 | 125 | 121 | 230 | 153 | 368 | 185 | 538 | 217 | 741 | 249 | 975 |
| 26 | 26 | 58 | 58 | 90 | 127 | 122 | 234 | 154 | 373 | 186 | 544 | 218 | 748 | 250 | 983 |
| 27 | 27 | 59 | 59 | 91 | 130 | 123 | 238 | 155 | 378 | 187 | 550 | 219 | 755 | 251 | 991 |
| 28 | 28 | 60 | 60 | 92 | 133 | 124 | 242 | 156 | 383 | 188 | 556 | 220 | 761 | 252 | 999 |
| 29 | 29 | 61 | 61 | 93 | 136 | 125 | 246 | 157 | 388 | 189 | 562 | 221 | 768 | 253 | 1007 |
| 30 | 30 | 62 | 62 | 94 | 139 | 126 | 250 | 158 | 393 | 180 | 568 | 222 | 775 | 254 | 1015 |
| 31 | 31 | 63 | 63 | 95 | 142 | 127 | 254 | 159 | 398 | 191 | 574 | 223 | 782 | 255 | 1023 |

TONALITY CORRECTION SYSTEM

BACKGROUND OF THE INVENTION

This invention relates to an image processing apparatus and method and, more particularly to an image processing apparatus and method applied to an image forming apparatus which forms a color image on a print medium in accordance with, e.g., an electrophotographic method.

Conventionally, in an image forming apparatus which forms an image where one pixel is represented by 8-bit (256 levels) image data in accordance with an electrophotographic method, image formation by using a look-up table (LUT) to correct a printer characteristic to a linear characteristic is known.

However, in the above image formation, when the printer characteristic is forcibly changed into a linear characteristic by using an LUT, tonality at a highlight portion (low-density portion) of a formed image is not satisfactorily represented with respect to resolution of human eyes, due to, e.g., γ characteristic unique to electrophotography. Such highlight portion with insufficient tonality may even have a pseudo outline. On the other hand, an attempt to improve the tonality representation capability by increasing the number of bits per pixel in all the image signals such as image input signal, may prolong the processing time, and increase memory capacity necessary for handling a large amount of data, thus increasing the cost of the apparatus.

SUMMARY OF THE INVENTION

Taking the above background into consideration, it is an object of the present invention to provide a cost-saving image processing apparatus and method which improves tonality representation capability at a highlight portion of a formed image, and realizes high-speed image formation.

According to one aspect of the present invention, the foregoing object is attained by providing an image processing apparatus comprising: input means for inputting multivalued image data capable of m-level representation; processing means for performing image processing on the multivalued image data inputted by the input means; and conversion means for converting the multivalued image data image-processed by the processing means into multivalued image data capable of n-level representation, such that the number of tonality levels n is greater than the number of tonality levels m.

According to another aspect of the present invention, the foregoing object is attained by providing an image processing method comprising: an input step of inputting multivalued image data capable of m-level representation; a processing step of performing image processing on the multivalued image data inputted at the input step; and a conversion step of converting the multivalued image data image-processed at the processing step into multivalued image data capable of n-level representation, such that the number of tonality levels n is greater than the number of tonality levels m.

In accordance with these aspects of the present invention as described above, input multivalued image data is converted to multivalued image data capable of n-level representation such that the number of tonality levels (m) of the input multivalued image data is increased to n (n>m).

The above construction may further include pulse-width modulation means for generating a pulse-width modulation signal by comparing the multivalued image data outputted from the conversion means with a pattern signal of a predetermined frequency. Otherwise, the above construction may further include image formation means for forming an image based on the multivalued image data capable of the n-level representation, converted by the conversion means.

Further, assuming that the density of an image formed on a print medium at a tonality level (x) is D(x), and the density of an image formed on the print medium at the next tonality level (x+1) is D(x+1), the conversion means may perform the conversion of multivalued image data such that the difference between the densities of the image at the tonality level (x) and the image at the tonality level (x+1) formed on the print medium by the image formation means satisfies $$D(x+1)-D(x) \leq A\ D(x)$$

$$(A \leq 0.08)$$

It is preferable that D(x) is greater than 0.08.

If the input multivalued image data is brightness data, the conversion means may convert the m-level brightness data into m-level density data. The conversion means can be used for further processing such as γ correction, edge enhancement and smoothing.

Otherwise, the conversion means may convert m-level density data into n-level density data. At this time, the conversion characteristic is set so as to have a high tonality representation capability with respect to density data having a relatively low density value, while have a low tonality representation capability with respect to density data having a relatively high density value. The conversion means may be constructed in the form of look-up table.

The relation between input density data and output density data which shows a conversion characteristic may be represented by a quadric curve.

It is preferable that as an image formation characteristic of the image formation means is represented by a quadric curve as the relation between input density data and output density data, and the characteristic of representation by the quadric curve with respect to tonality representation of relatively-low density data is determined in consideration of the density-difference discrimination ability of human eye.

Further, it is preferable that the input multivalued data is color image data which comprises multivalued R, G and B component data.

Further, it is preferable that the input means includes reading means for reading an image original and generating multivalued image data.

Further, it is preferable that the image formation is performed in accordance with an electrophotographic method.

According to still another aspect of the present invention, the foregoing object is attained by providing an image processing apparatus comprising: input means for inputting image data; and image formation means for forming an image on a print medium based on the image data, wherein the image formation means forms an image such that the difference between an image density D(x) of the image formed on the print medium at a tonality level x and an image density D(x+1) of an image formed on the print medium at the next tonality level x+1 satisfies $$D(x+1)-D(x) \leq A \times D(x) (A \leq 0.08)$$

According to still another aspect of the present invention, the foregoing object is attained by providing an image processing method comprising: an input step of inputting image data; and an image formation step of forming an image on a print medium based on the image data, wherein at the image formation step, an image is formed such that the difference between an image density D(x) of the image formed on the print medium at a tonality level x and an image density D(x+1) of an image formed on the print medium at the next tonality level x+1 satisfies $$D(x+1)-D(x) \leq A \times D(x)(A \leq 0.08)$$

It is preferable that D(x)>0.08 holds.

Further, the image formation characteristic is represented by a quadric curve as the relation between input density data and output density data. The input means preferably includes reading means for reading an image original and generating the image data.

Further, it is preferable that the image formation is performed in accordance with an electrophotographic method.

Further, the image formation is preferably performed by using pulse-width modulation means for performing pulse-width modulation on the input image data based on a pattern signal having a rectified sine wave of a predetermined frequency.

The above image data is preferably color image data.

According to still another aspect of the present invention, the foregoing object is attained by providing an image processing apparatus comprising: input means for inputting image data; pattern-signal generation means for generating a pattern signal having a rectified sine wave having a predetermined period; and modulation means for generating a beam based on the pattern signal generated by the pattern-signal generation means, and generating a pulse-width modulated signal by performing pulse-width modulation on the image data.

According to still another aspect of the present invention, the foregoing object is attained by providing an image processing method comprising: an input step of inputting image data; a pattern-signal generation step of generating a pattern signal having a rectified sine wave having a predetermined period; and a modulation step of generating a beam based on the pattern signal generated at the pattern-signal generation means, and generating a pulse-width modulated signal by performing pulse-width modulation on the image data.

It may be arranged such that the above construction further comprises image formation means for forming an image based on a pulse-width modulation signal, and where the image formation characteristic is represented by a quadric curve as the relation between input density data and output density data.

The above image data is preferably color image data.

The invention is particularly advantageous since the input multivalued image data is converted to multivalued image data capable of n-level tonality representation such that the number of tonality levels (m) of the input multivalued image data is increased to n (n>m). In image formation using the converted image data, a highlight portion (low density area) of the formed image can be represented with a sufficient tonality, and occurrence of pseudo outline and the like can be prevented. Thus, higher quality image formation is possible.

Further, the conversion does not increase the number of tonality levels of the input image data, but increases the number of levels of the output data as a result of internal processing in an image processing apparatus before image formation. This means that the overall apparatus does not handle a large amount of data. This avoids degradation of processing speed or increase of memory capacity.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 is an LUT for tonality conversion from 8-bit representation to 10-bit representation;

DETAILED DESCRIPTION OF THE PREFERRED EMBODIMENTS

Preferred embodiments of the present invention will now be described in detail in accordance with the accompanying drawings.

Figure 1:
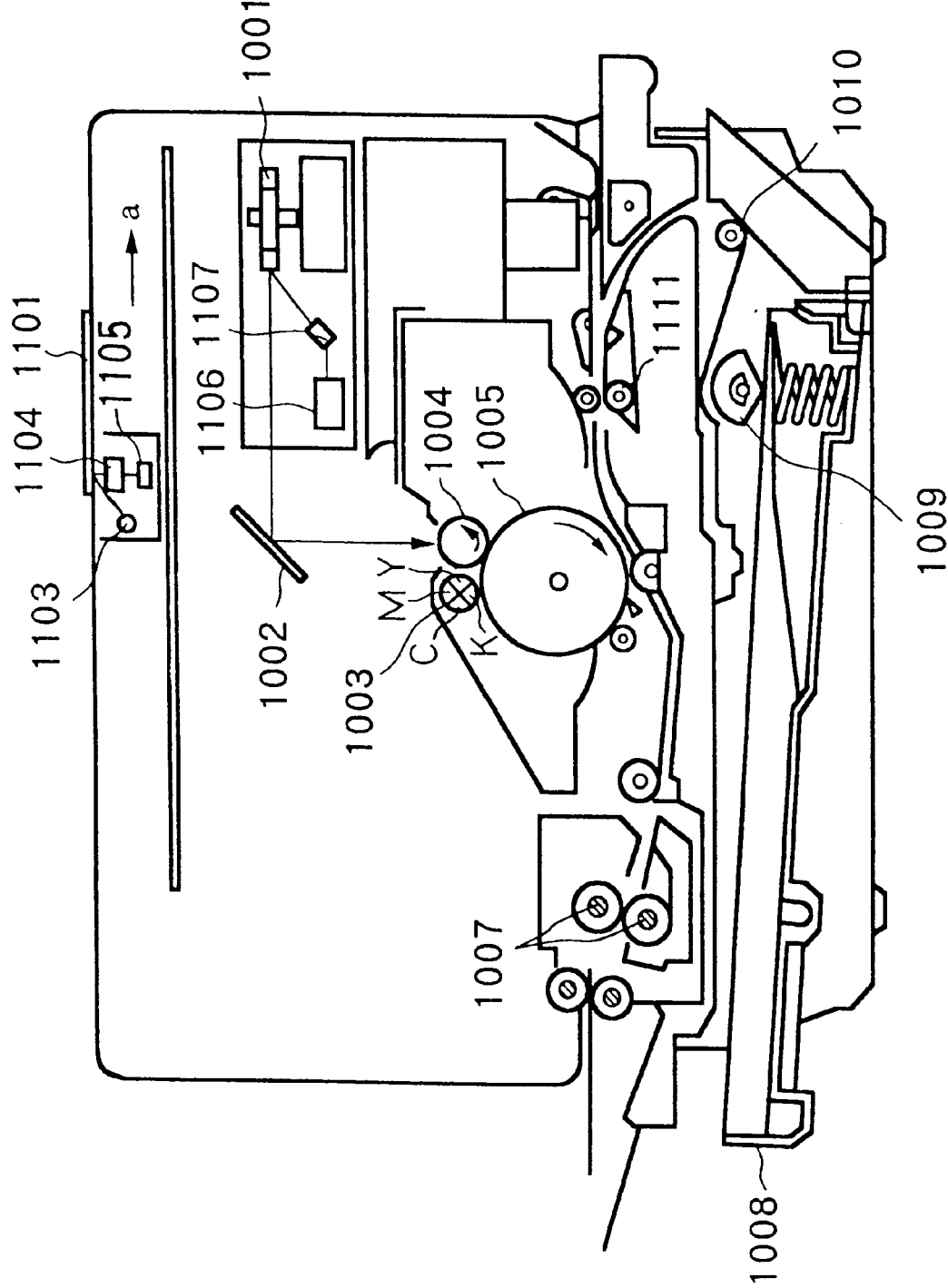
FIG. 1 is a cross-sectional side view showing the structure of a color copying machine having a laser-beam printer as a representative embodiment of the present invention, which performs image formation in accordance with an electrophotographic method.

FIG. 1 is a cross-sectional view showing the structure of a color copying machine having a laser-beam printer as a representative embodiment of the present invention, which performs image formation in accordance with an electro-photographic method,.

In FIG. 1, an original 1101 is irradiated by a lamp 1103, and reflected light from the original 1101 is forms an image in a line image sensor (CCD sensor) 1105 via an optical lens 1104 comprising a lens and the like. The direction of an array of photoreception devices of the CCD sensor 1105 (direction perpendicular to the FIG. 1 sheet) is referred to a main-scanning direction. Note that an image reading unit comprising the lamp 1103, the optical lens 1104, the line image sensor 1105 and the like is scanned by a driving subsystem (not shown) in a subscanning direction (arrow a direction in FIG. 1), thus reads the entire image of the original 1101.

Although the detailed description will be made later, an image signal outputted from the CCD sensor 1105 is converted into laser light by a laser driver 1106 and a semiconductor laser 1107. The laser light outputted from the semiconductor laser 1107 as a laser light source is reflected and guided by a polygon mirror 1001 and a mirror 1002, to scan on an electrostatic drum 1004. The electrostatic drum 1004 rotates in a direction indicated by the arrow. By the scanning of the laser light, a latent image is formed on the surface of the electrostatic drum 1004. The latent image on the electrostatic drum 1004 is developed by a rotating developer 1003, into images of respective color components. FIG. 1 shows the development by the developer 1003 with yellow (Y) toner.

On the other hand, a print sheet, supplied from a paper cassette 1008 by a paper-feed cam 1009 and a paper-feed roller 1010, is conveyed by a resist roller 1111 to a transfer drum 1005 at predetermined timing, and is attached around the transfer drum 1005. As the transfer drum 1005 turns round, yellow (Y), magenta (M), cyan (C) and black (K) toner images are transferred, sequentially by one rotation, on the print sheet on the transfer drum 1005. When the transfer drum 1005 has made four rotations, the transfer of toner images has been completed.

The print sheet on which the toner images have been transferred is separated from the transfer drum 1005, then the toner images are fixed by a pair of fixing rollers 1007. After the color-image printing has been completed, the print sheet is discharged from the apparatus. Note that the color toners used in this apparatus are produced by synthesizing coloring material of the respective colors with styrene polymer resin as a binder.

Figure 2:
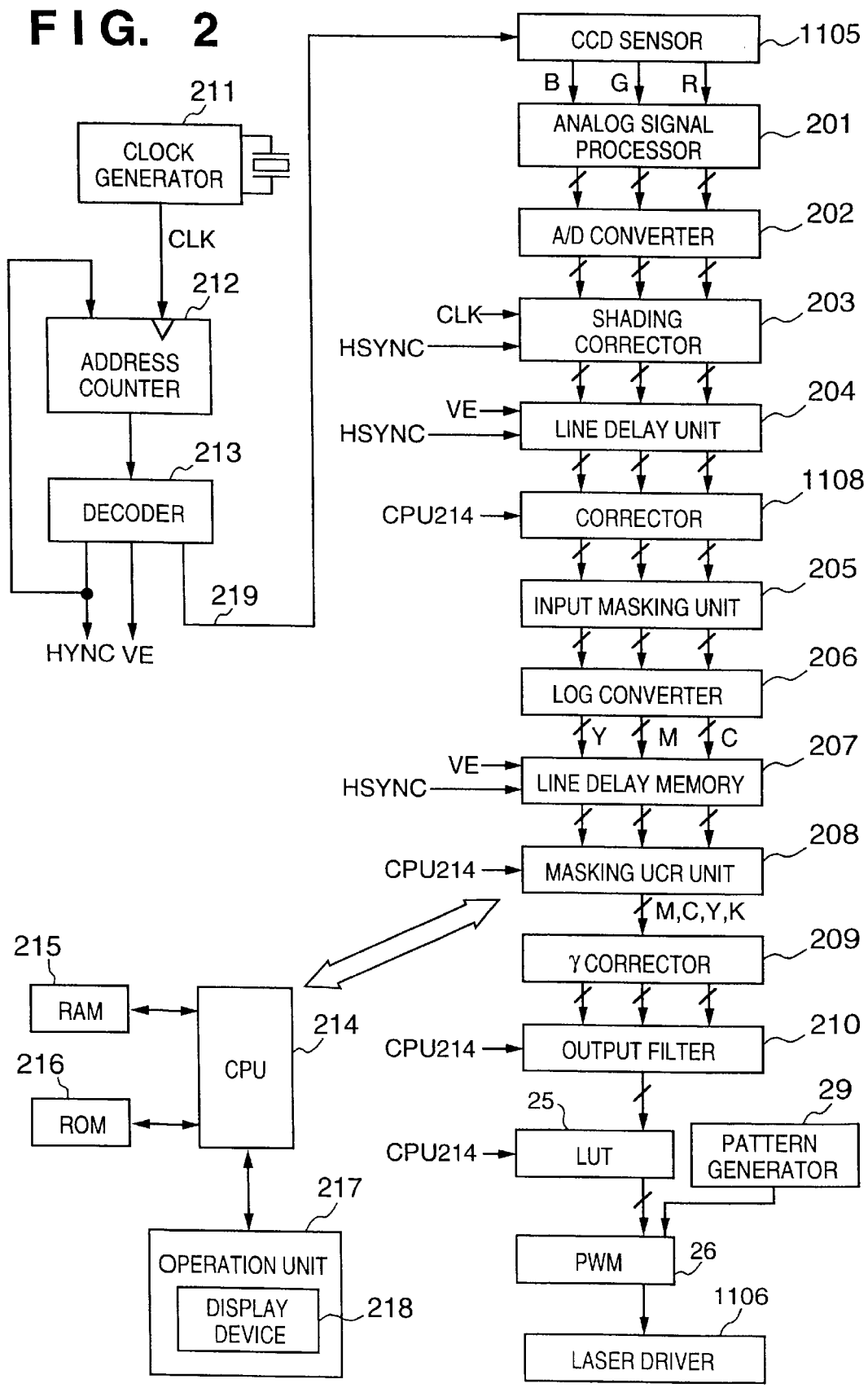
FIG. 2 is a block diagram showing the construction of an image signal processor for obtaining a gradation image.

FIG. 2 is a block diagram showing the construction of an image signal processor in the apparatus in FIG. 1 for obtaining a gradation image. In FIG. 2, the elements corresponding to those in FIG. 1 have the same reference numerals.

In FIG. 2, a CPU 214 controls the overall apparatus in accordance with control programs pre-stored in a ROM 216. A RAM 215 is used by the CPU 214 as a work area. Image processing parameters and the like as well as the control programs are stored in the ROM 216. An operation unit 217 has a keyboard, a touch panel and a display device 218 such as an LCD. The operation unit 217 transfers an instruction from an operator to the CPU 214, and displays operation condition or operation status of the apparatus, under the control of the CPU 214.

An address counter 212 counts image clock (CLK), in one pixel unit, generated by a clock generator 211, and outputs a main-scanning address signal indicating an pixel address of one line. A decoder 213 decodes the main-scanning address signal outputted from the address counter 212, and generates a signal 219, like a shift pulse or reset pulse used for driving the CCD sensor 1105 in line units, a signal VE indicating an effective area in the signal for one line outputted from the CCD sensor 1105, a line synchronizing signal HSYNC and the like. Note that the address counter 212 is cleared by the synchronizing signal HSYN, then starts counting for the main-scanning address of the next line.

The R, G and B image signals outputted from the CCD sensor 1105 are inputted into an analog signal processor 201, in which the gain and offset values of the signals are adjusted, then converted by an A/D converter 202, by each color component, into R, G and B digital image signals, each as 8-bit data, for example. Then, a shading corrector 203 performs well-known shading correction on the R, G and B digital image signals, using a signal read from a reference white board 106, by each color component.

A line delay unit 204 corrects spatial shifts included in the image signals outputted from the shading corrector 203. The spatial shifts are caused by the arrangement of line sensors constituting the CCD sensor 1105, provided corresponding to the respective color components at predetermined intervals in the subscanning direction. The line delay unit 204 line-delays the R and G component signals, in the subscanning direction, with the B component signal as a reference signal, thus synchronizes the phases of the three color component signals.

Although the detailed description will be made later, a corrector 1108 performs brightness correction on the image signals outputted from the line delay unit 204.

An input masking unit 205 converts the corrected image signals, outputted from the corrector 1108, into data in the NTSC standard color space by matrix calculation as follows. That is, the respective color space data of the color component signals, determined by spectrum characteristics of the respective color filters of the CCD sensor 1105, are converted into data in the NTSC standard color space:

$$\begin{bmatrix} G_o \\ B_o \end{bmatrix} = \begin{bmatrix} a_{21} & a_{22} & a_{23} \\ a_{31} & a_{32} & a_{33} \end{bmatrix} \begin{bmatrix} G_i \\ B_i \end{bmatrix} \quad (1)$$

$R_o$, $G_o$, $B_o$: output image signals
$R_i$, $G_i$, $B_i$: input image signals A LOG converter 206 comprises an LUT stored in a ROM or the like. The LOG converter 206 converts the R, G and B signals outputted from the input masking unit 205 into C, M and Y density signals. A line delay memory 207 delays the image signals outputted from the LOG converter 206 for a period (line-delay period) in which a black-character determination unit (not shown) generates control signals UCR, FILTER, SEN and the like based on the outputs from the input masking unit 205.

A masking UCR unit 208 extracts a black component signal K from the C, M and Y image signals outputted from the line delay memory 207, and performs matrix calculation on the Y, M, C and K image signals to correct color mixture of printing color material (toner), then, outputs, e.g., 8-bit color-component image signals, in the order of M, C, Y and K, for each reading operation of the image reading unit. Note that matrix coefficients used in the matrix calculation are set by the CPU 214.

A γ corrector 209 performs density correction on the image signal outputted from the masking UCR unit 208 so as to adjust the image signal to an ideal tonality characteristic of the laser-beam printer. An output filter (space filter processor) 210 performs edge enhancement or smoothing on the image signal outputted from the γ corrector 209, in accordance with a control signal from the CPU 214.

Although the detailed description will be made later, an LUT 25 is used for adjusting the density of an output image to that of an original image. The LUT 25, set by the CPU 214, comprises a RAM, for example. A pattern generator 29 generates a test pattern. A pulse-width modulator (PWM) 26 outputs a pulse signal having a pulse width corresponding to the level of the input image signal. The pulse signal is inputted into the laser driver 1106 for driving the semiconductor laser 1107 as a laser light source. Accordingly, it can be said that this apparatus performs tonality representation by pulse-width conversion processing.

Figure 3:
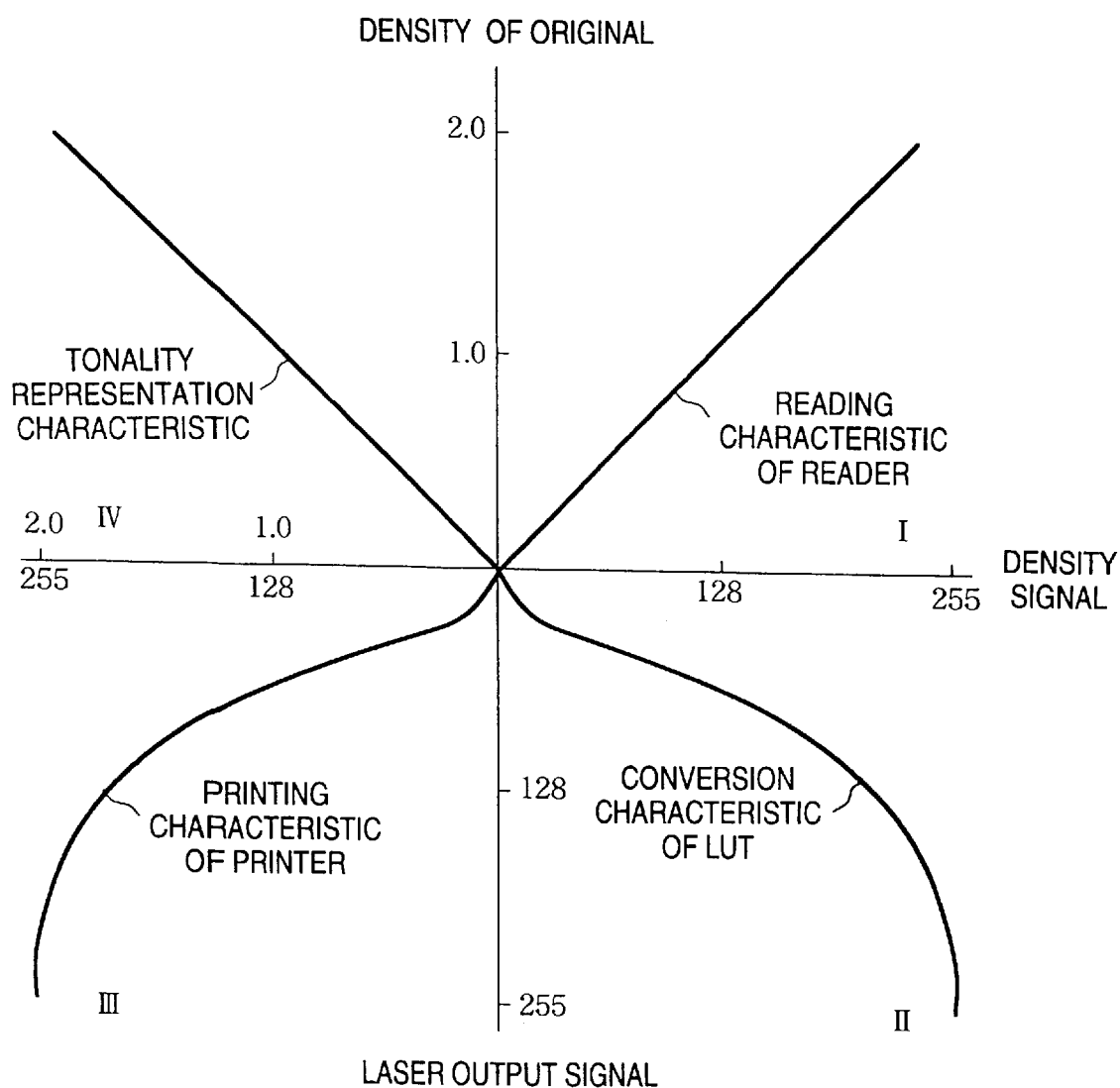
FIG. 3 is a four-quadrant chart showing tonality representation.

FIG. 3 is a four-quadrant chart showing tonality representation.

In FIG. 3, the quadrant I shows a conversion characteristic of converting the density of an original into a density signal, reflecting the reading characteristic of the image reading unit; the quadrant II, the conversion characteristic of the LUT 25 for converting the density signal into a laser output signal; the quadrant III, the printing characteristic of the laser-beam printer for converting the laser output signal into an output density; and the quadrant IV, the relation between the density of the original and the output density, i.e., the total tonality representation characteristic of the apparatus. Note that as this embodiment performs 8-bit digital processing, the number of tonality levels is "256".

Next, the pulse-width conversion will be described.

Figure 4:
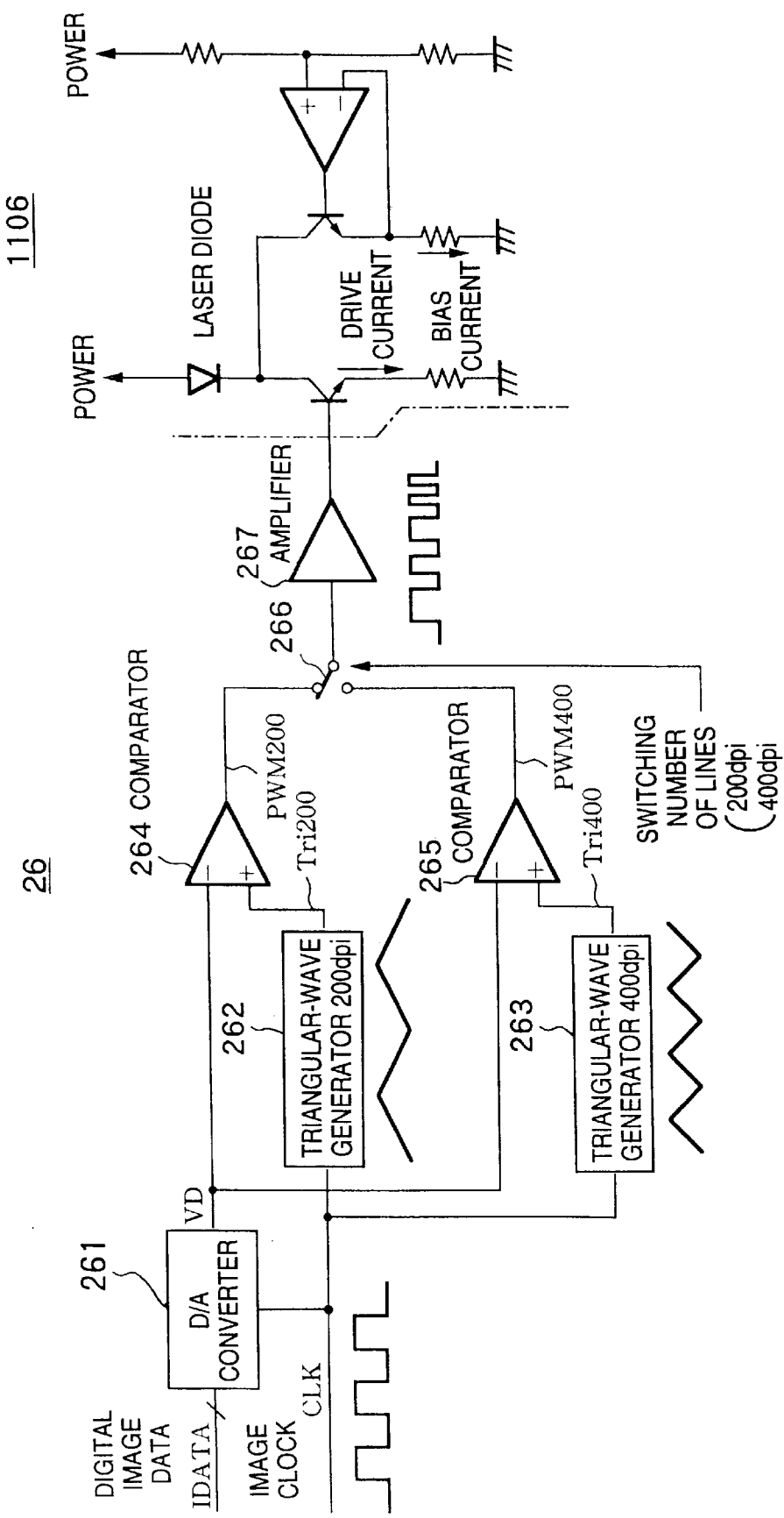
FIG. 4 is a block diagram showing the detailed construction of a pulse-width modulator (PWM) 26 and that of a laser driver 1106.

FIG. 4 is a block diagram showing the detailed construction of the PWM 26 and that of the laser driver 1106. In FIG. 4, triangular-wave generators 262 and 263 corresponding to 200 dpi resolution and 400 dpi resolution, respectively, generate triangular waves Tri200 and Tri400 corresponding to 200 dpi and 400 dpi resolutions. A D/A converter 261 converts an input digital image signal IDATA into an analog video signal VD. A comparator 264 compares the triangular wave Tri200 generated by the triangular-wave generator 262 with the analog video signal VD, and generates a pulse-width modulated signal PWM200. Similarly, a comparator 265 compares the triangular wave Tri400 generated by the triangular-wave generator 265 with the analog video signal VD, and generates a pulse-width modulated signal PWM 400. One of these modulated signals is selected by a switch 266, in correspondence with the value of instructed printing resolution data, in unit of one pixel period of the input image signal. An amplifier 267 amplifies the selected signal, and outputs the amplified signal, as a pulse-width modulated signal, to the laser driver 1106.

Figure 5:
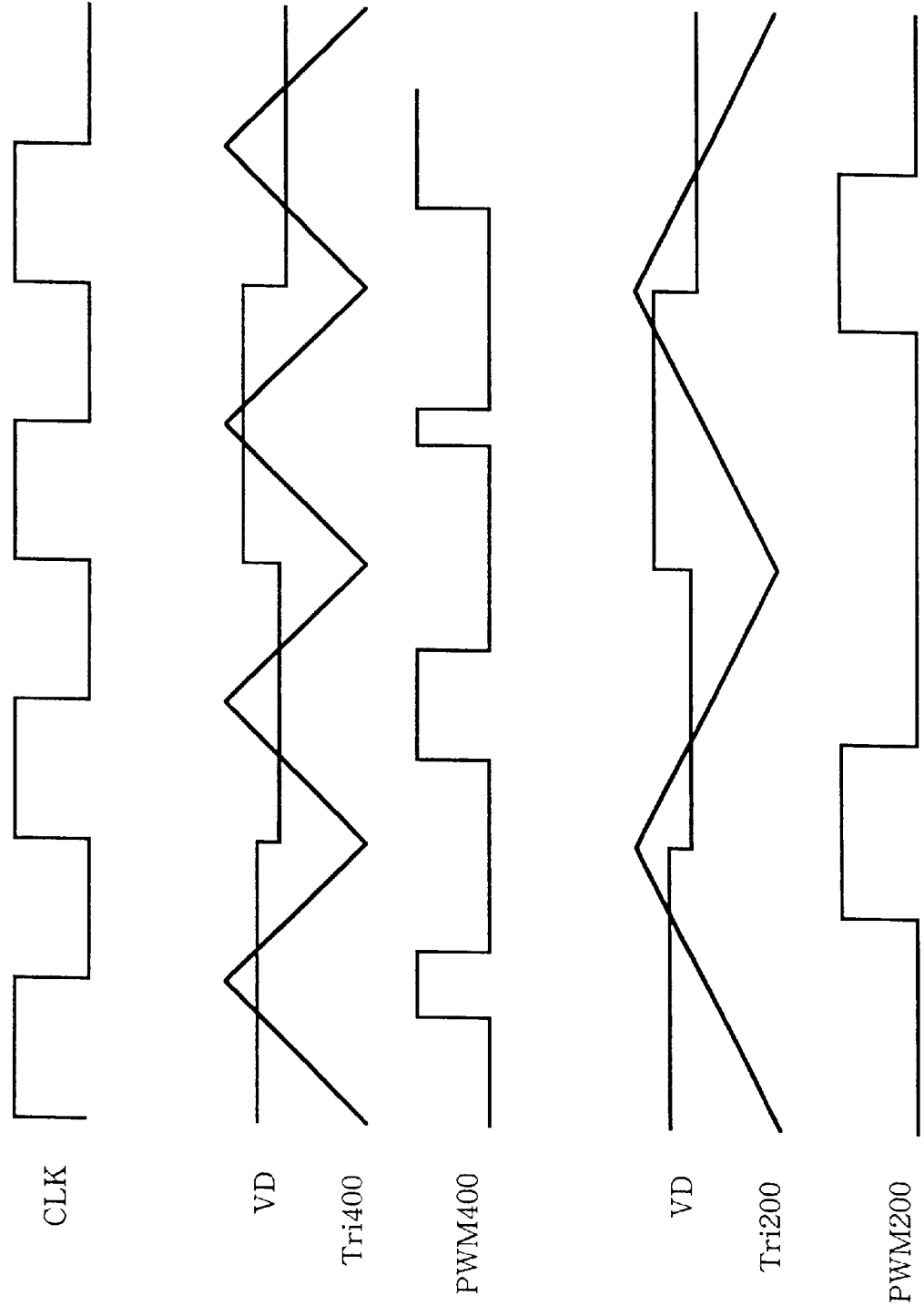
FIG. 5 is a timing chart showing signals handled by the PWM 26.

FIG. 5 is a timing chart showing the signals handled by the PWM 26. In this figure, the signals have reference numerals of signals in FIG. 4.

Figure 6:
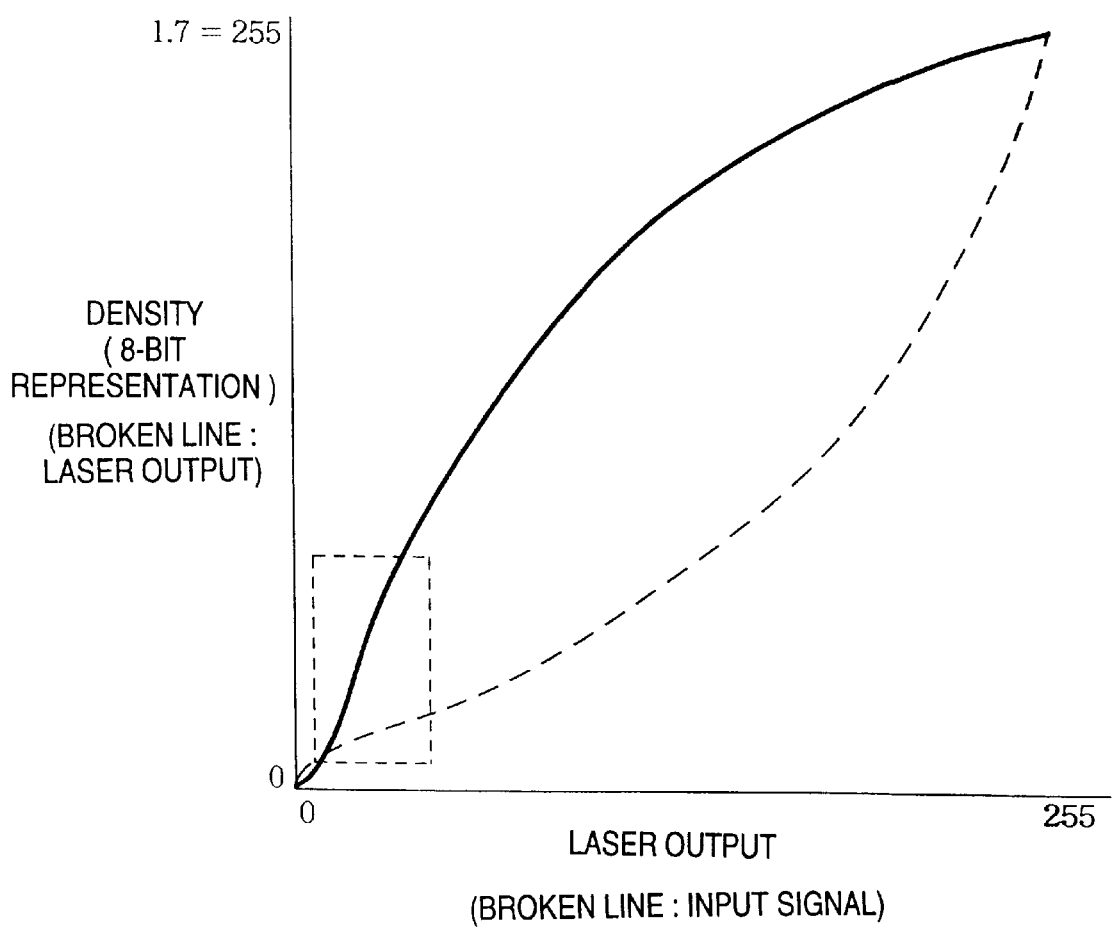
FIG. 6 is a graph showing a printer characteristic and an LUT characteristic representing the relation between density values (one pixel is represented by 8 bits) and laser output.

Note that description will be made in a case of a printer having a 256-level tonality representation capability, where one pixel (of each color component) is represented by 8 bits. In this case, a density level "1.7" is normalized to a density level "255" so that the maximum density ("Dmax") is adjusted to the density level "1.7". FIG. 6 shows the printer characteristic of this printer by a solid line as the relation between density values and laser output. As shown in FIG. 6, at a highlight portion (dotted-line block) having low density values, although the density value changes, the laser output does not change greatly. On the other hand, at a shadow portion, of an image, having high density values, the laser output changes greatly while the density value changes slightly. Accordingly, to correct this printer characteristic to a linear characteristic by using the LUT 25 (see FIG. 2), the printer characteristic is multiplied by values of the LUT having a characteristic represented by a dotted line curve in FIG. 6.

Figure 7:
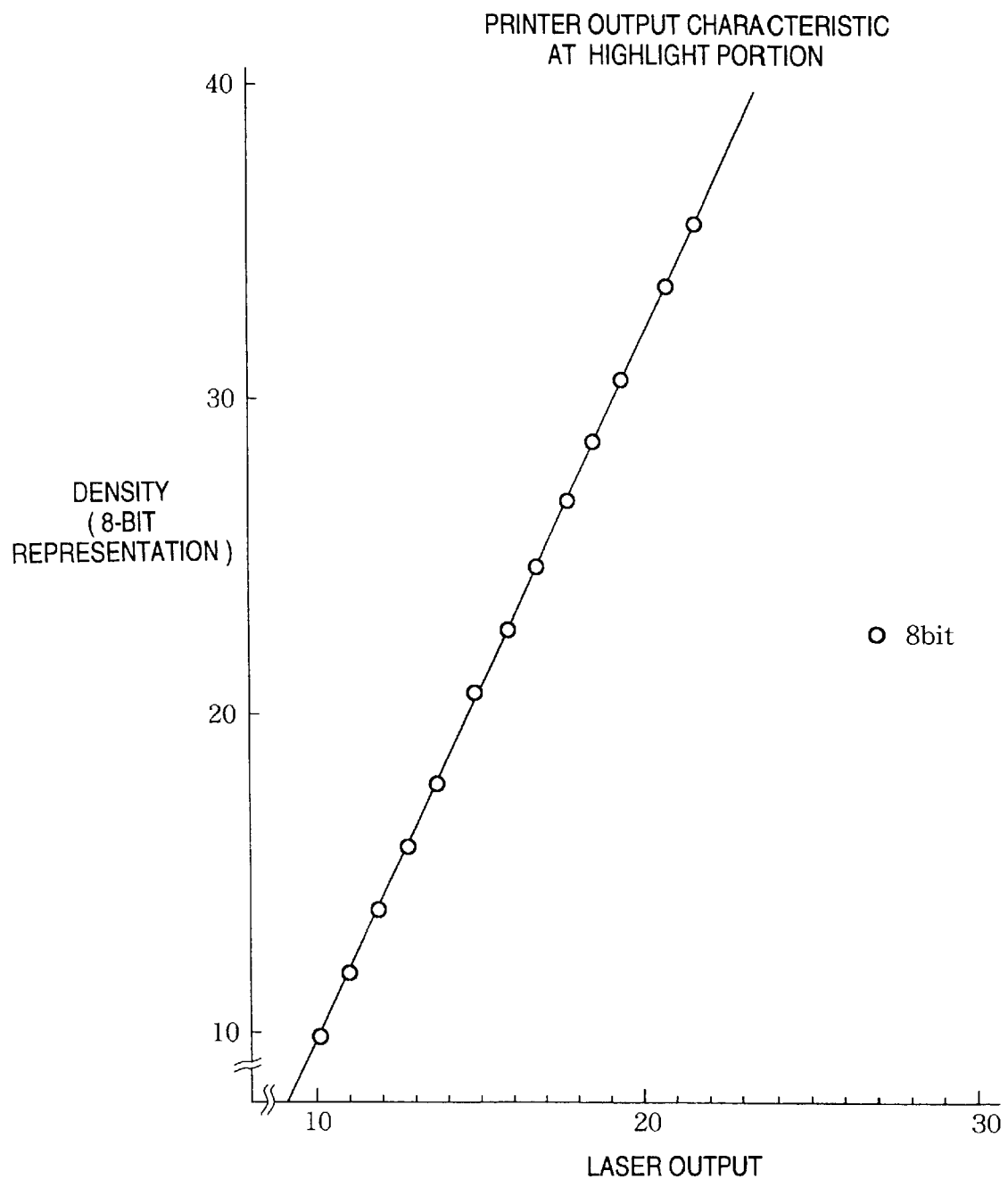
FIG. 7 is an enlarged view of a part of the printer characteristic in the graph in FIG. 6.
Figure 8:
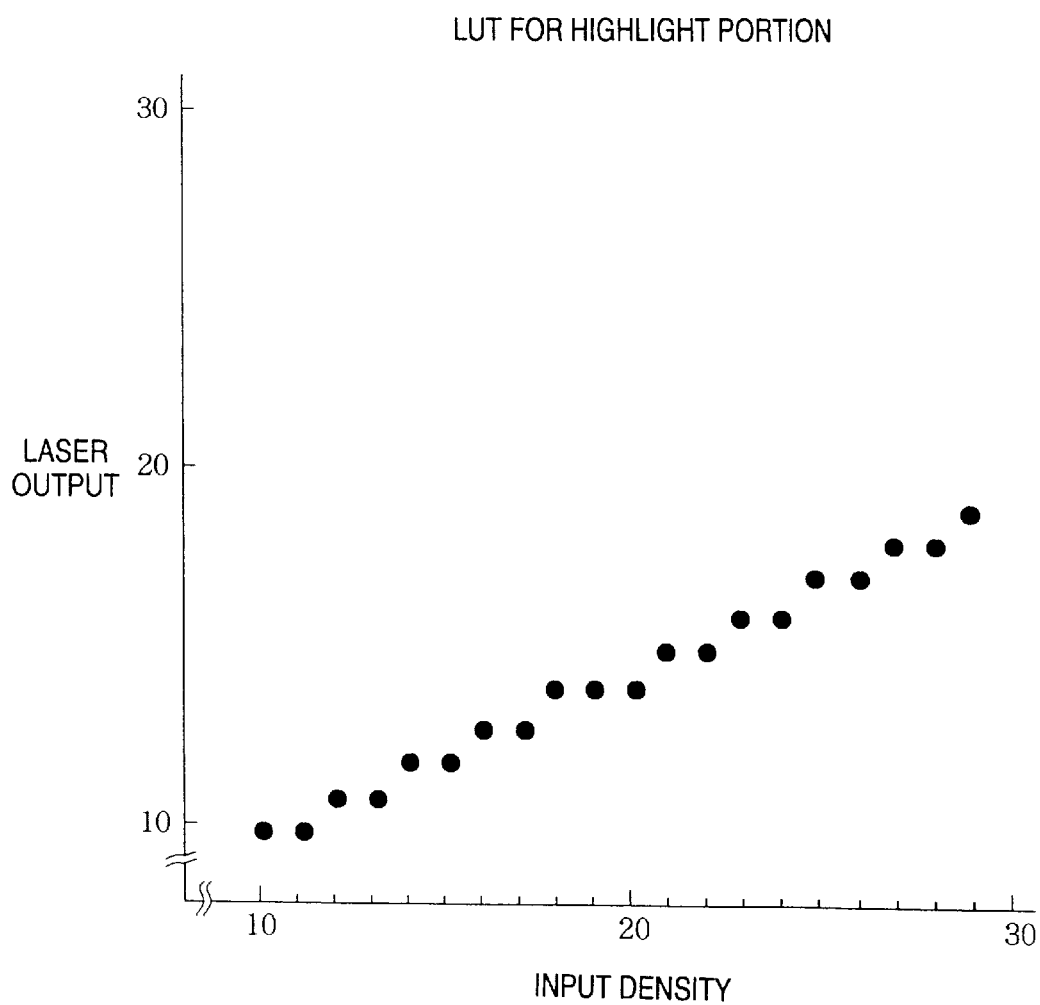
FIG. 8 is an enlarged view of a part of the LUT characteristic in the graph in FIG. 6.

FIG. 7 is an enlarged view of the highlight portion in the dotted-line block in FIG. 6. FIG. 8 is an enlarged view of the LUT characteristic in the dotted-line block of in FIG. 6. Note that as the image signal actually handled is a digital signal where one pixel is represented by 8 bits, the LUT generated in consideration of the image signal has a stepwise characteristic where a plurality of laser output values having the same value are arranged with respect to different input density, as shown in FIG. 8.

Figure 9:
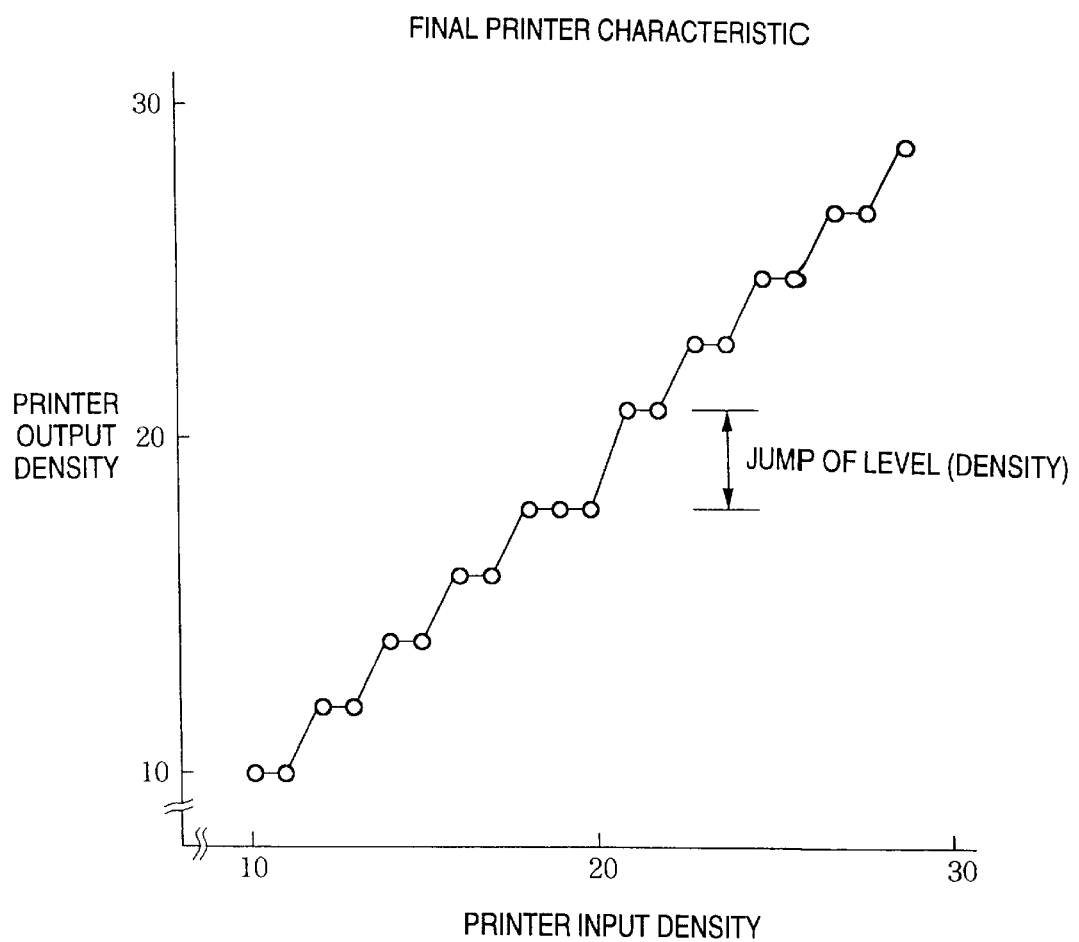
FIG. 9 is a graph showing the final printer characteristic in a case where one pixel is represented by 8 bits.

FIG. 9 shows the final printer characteristic at the highlight portion as the relation between the image signal (printer input density) converted by the LUT having the above-mentioned characteristic and a printer output density. In the final printer characteristic shown in FIG. 9, the printer output density does not change with respect to a change of an input density value over a certain range, while the printer output density jumps with respect to a slight change of an input density value over another certain range. According to this printer characteristic, the number of tonality levels for representing a highlight portion substantially decreases, and the representation capability for the highlight portion, which is the most important in image formation, becomes poor. This printer characteristic further causes a pseudo outline.

Figure 10:
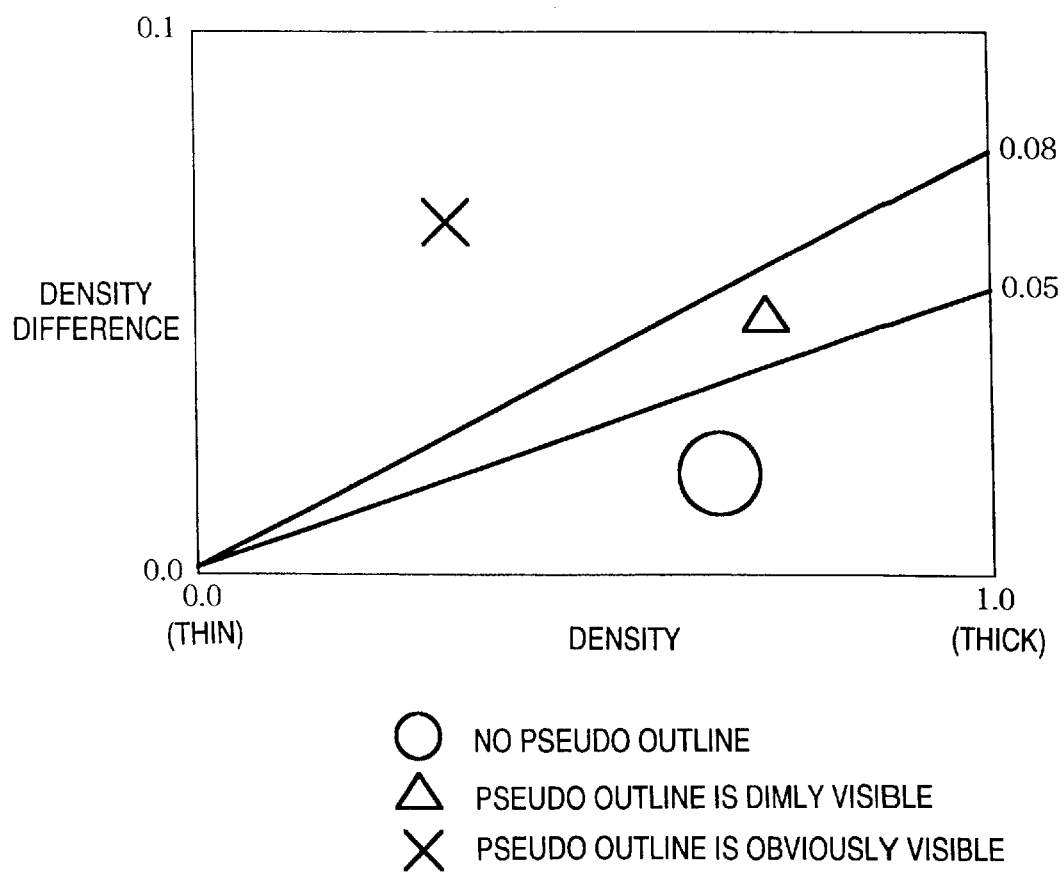
FIG. 10 is a line graph showing a perceptional characteristic of human eye.

FIG. 10 is a line graph showing the perceptional characteristic of human eye.

In FIG. 10, the horizontal axis shows the density, while the vertical axis shows density differences, which man can discriminate. A density difference is determined when a person observes two patches having different densities and recognizes a border line (pseudo outline) between these patches. At this point, the density difference is a minimum density difference that the person can perceive.

As shown in FIG. 10, the human eye has a higher sensitivity at a highlight (low-density) portion than at a high-density portion. For example, at a highlight portion at about "0.1" density level, if the density difference becomes about "0.005", the human eye perceives the density difference, and in an gradation image, recognizes a pseudo outline.

Figure 11:
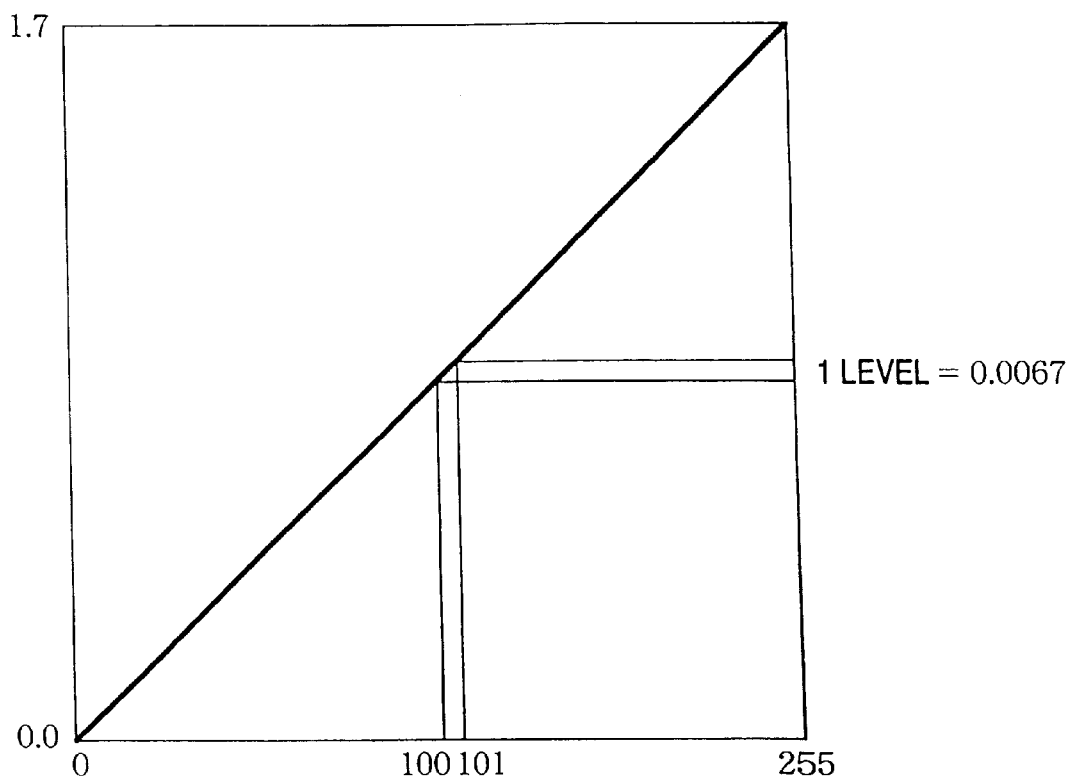
FIG. 11 is a line graph showing the density differences by one tonality level in a case where the printer output characteristic is corrected to a linear characteristic.

As described above, in the printer having a 256-level tonality representation capability where one pixel is represented by 8 bits, when a density level "1.7" is normalized to "255" so that the maximum density "Dmax" is adjusted to a density level "1.7" and the printer output characteristic is corrected to a linear characteristic, the density difference between respective one levels is about 1.7/255≈0.0067 (>0.005), as shown in FIG. 11. Accordingly, at a highlight portion having a density level of about "0.1", the human eye perceives a pseudo outline. To avoid the occurrence of pseudo outline, gradation representation at a highlight portion must be abandoned. However, this causes a problem in that delicate color such as a skin color cannot be well represented.

Figure 12:
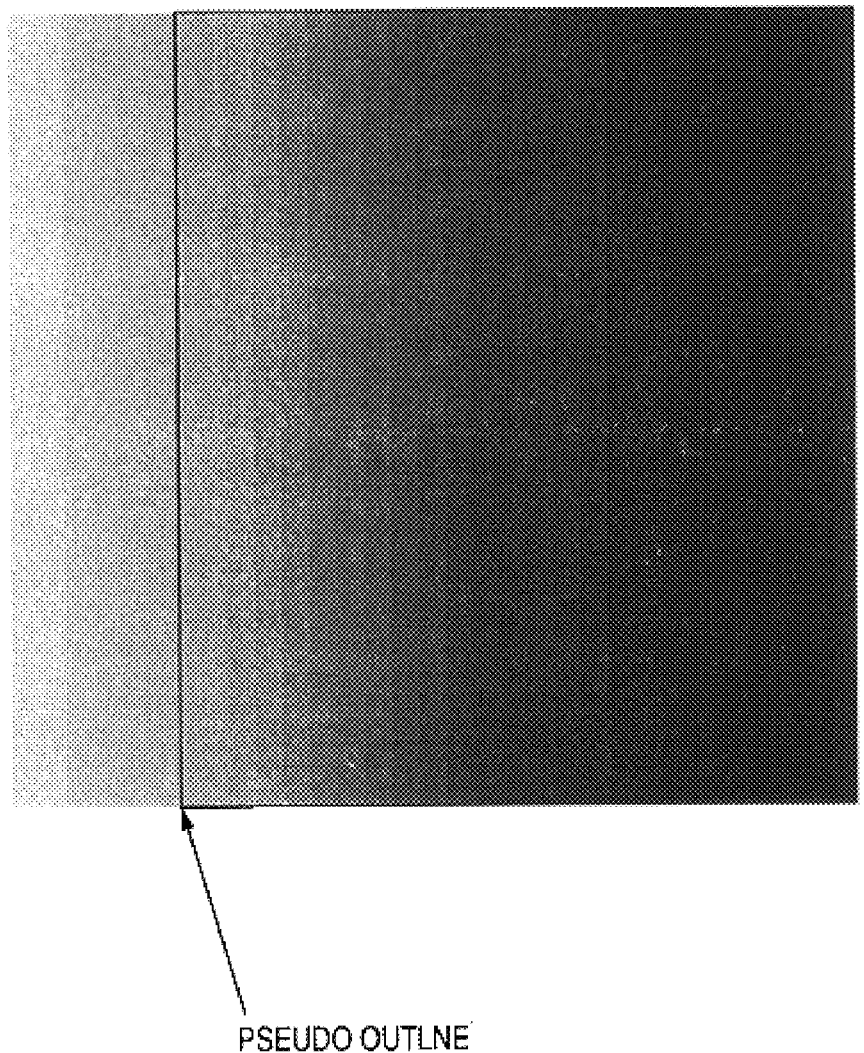
FIG. 12 is a sample gradation image outputted by a printer having the output characteristic as shown in FIG. 11.

On the other hand, a printer characteristic in accordance with a normal electrophotographic method is as shown by the solid line in FIG. 6. This characteristic has a poor tonality representation capability at a highlight portion, and good tonality representation capability at a high-density portion, which is opposite to the human perceptional characteristic. Even if a printer having this characteristic is used for tonality conversion using an LUT to correct its printer output characteristic to a linear characteristic, a gradation image has a pseudo outline at a highlight portion as shown in FIG. 12.

Figure 13:
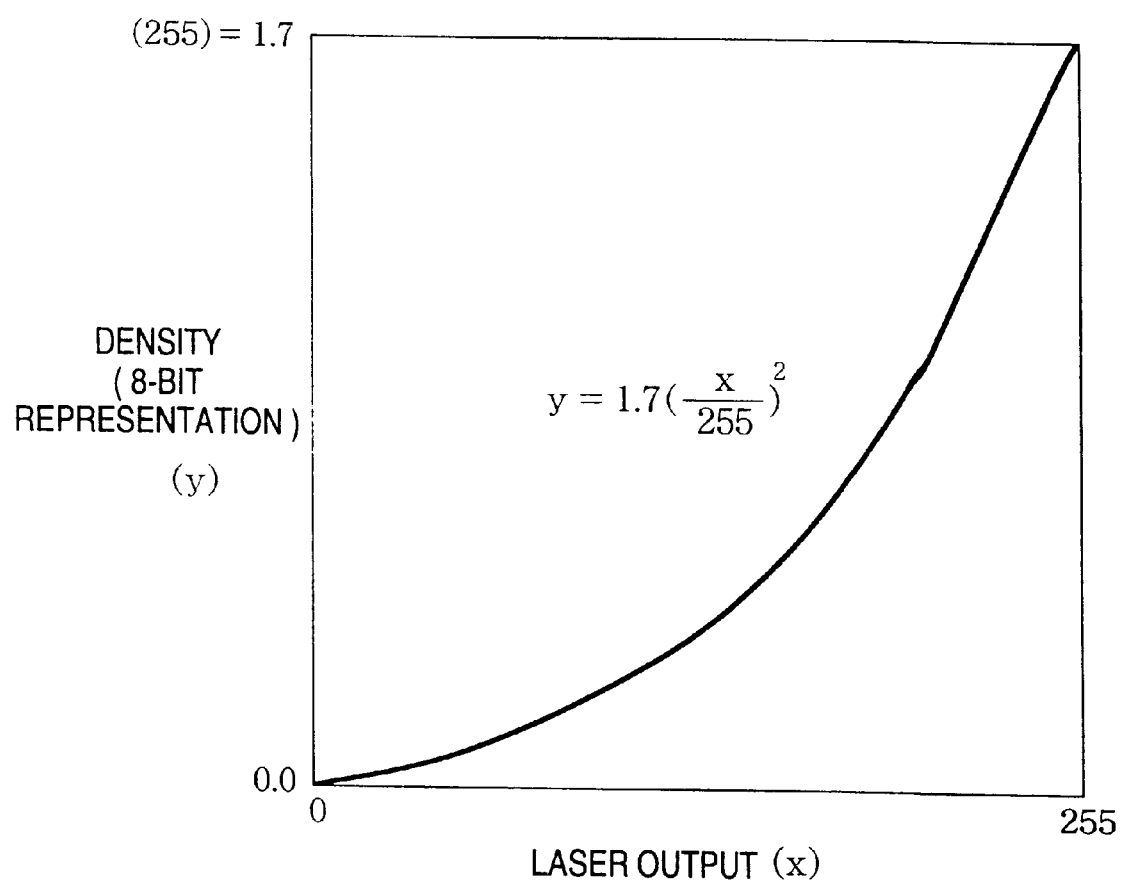
FIG. 13 is a line graph showing a printer output characteristic represented by a quadric curve.

In the present embodiment, to prevent occurrence of pseudo outline, the printer characteristic is corrected to an output characteristic as represented by a quadric curve in FIG. 13. Similar to FIG. 6, FIG. 13 shows density values on the vertical (y) axis, and laser output on the horizontal (x) axis. In FIG. 13, as a density level "1.7" is normalized into "255", the quadric curve is represented by a function:

$$y=1.7\cdot(x/255)^2$$

This increases the number of tonality levels representable at a highlight portion.

Figure 15:
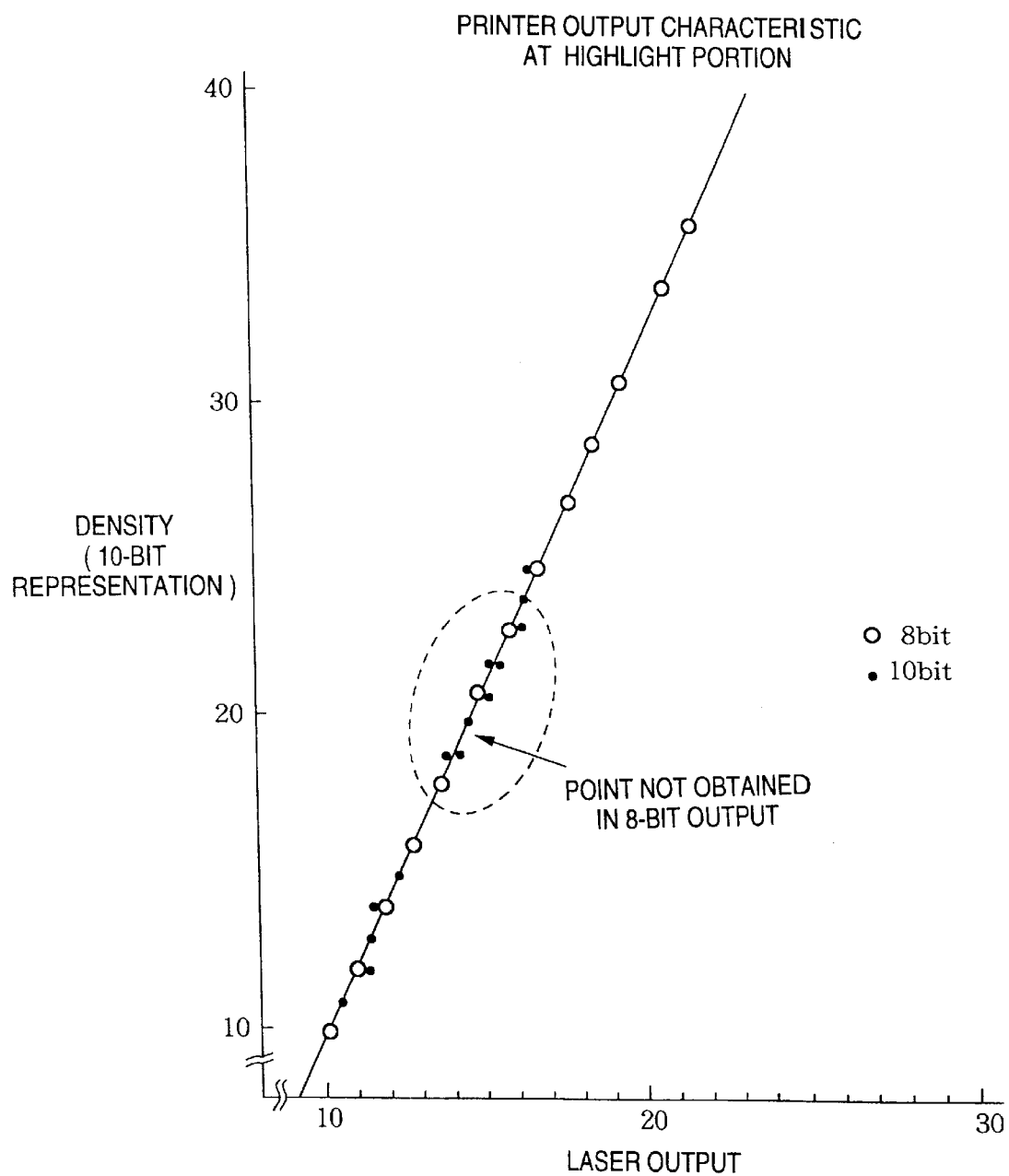
FIG. 15 is a line graph showing a printer characteristic at a highlight portion as the relation between density values (one pixel is represented by 10 bits) and laser output.

To realize this tonality representation capability, it is arranged such that signal processing by the LUT 25, PWM 26 and the laser driver 1106 as shown in FIG. 2 is performed by 10 bit per pixel. Accordingly, the image signal where one pixel is represented by 8 bits, inputted into the LUT 25, is converted into an image signal where one pixel is represented by 10 bits, by using an LUT as shown in FIG. 14. This tonality conversion enables a printer characteristic represented as follows, where the 10 bit image signal has a high tonality representation capability at a highlight portion, while has a low tonality representation capability at a high-density portion:

$$D(x+1)-D(x) \leq A \times D(x)$$

where A≦0.08 (preferably, A≦0.05)
D(x)>0.08
x: laser output value
D(x): output density In this manner, increasing the number of tonality levels from "256" (8-bit representation) to "1024" (10-bit representation), the number of tonality levels becomes four times the number of tonality levels in a case of FIG. 7 ("256" levels), as shown in FIG. 15. Further, comparing these tonality representation capabilities at a highlight portion having about "10" to "20" density level, merely five levels of tonality can be represented as laser output in the case of FIG. 7, while about 10 levels of tonality can be represented in the case of FIG. 15. The LUT characteristic corresponding to the representation capability is not a stepwise but a smooth curve (straight line).

Figure 16:
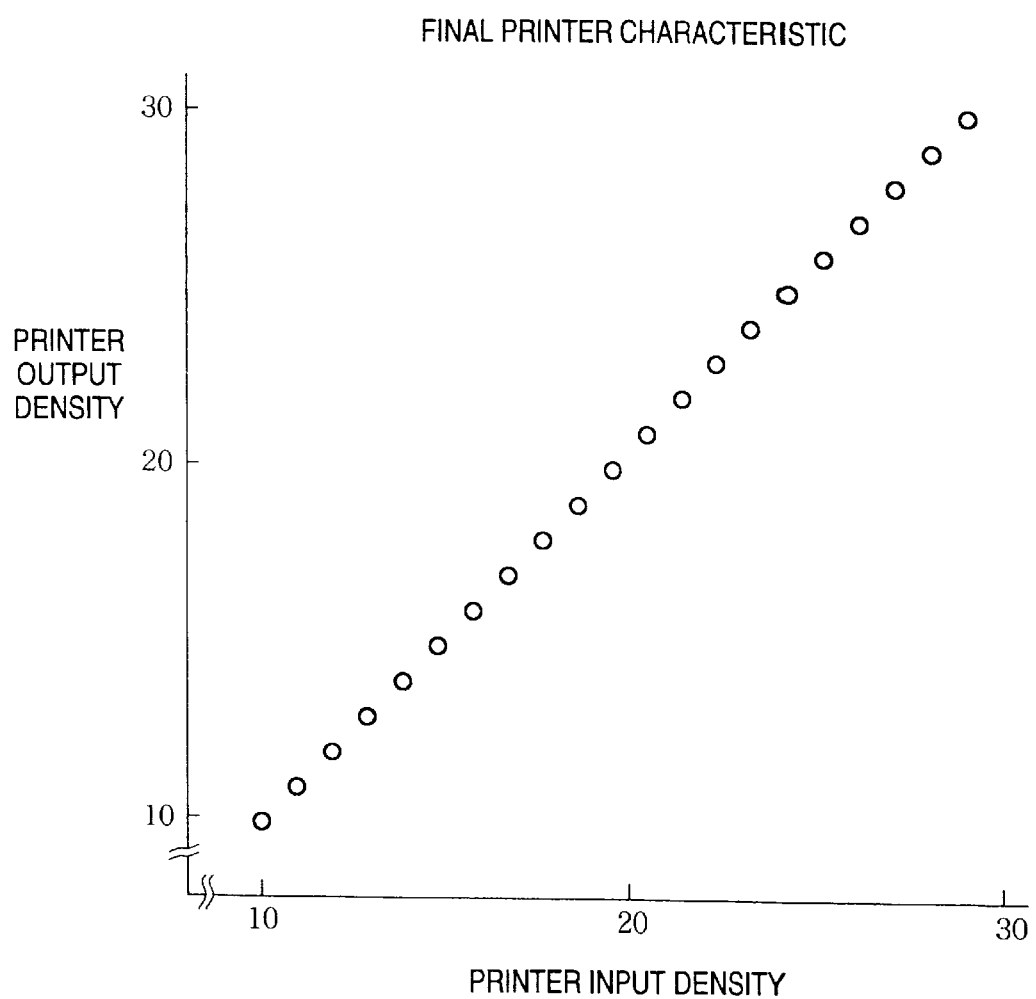
FIG. 16 is a line graph showing the final printer characteristic in the case where one pixel is represented by 10 bits.

Accordingly, as shown in FIG. 16, the final printer characteristic at a highlight portion, represented as the relation between the image signal (printer input density) converted by using an LUT having the above characteristic and printer output density, is an ideal straight line without any jump of tonality level.

Figure 17:
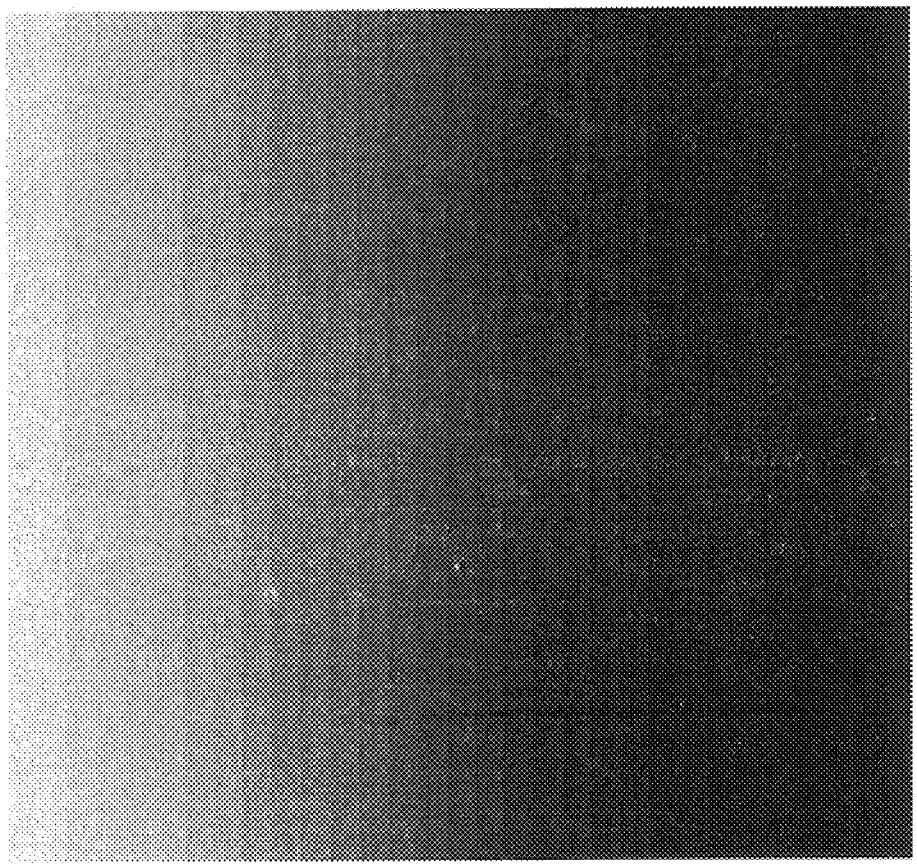
FIG. 17 is a sample gradation image outputted by a printer having the output characteristic as shown in FIG. 13.

In this printer output characteristic, when image output is performed based on the image signal as shown in FIG. 12 to output a gradation image, a gradation image having no pseudo outline as shown in FIG. 17 can be obtained. In comparison with FIG. 12, it is understood from FIG. 17 that tonality representation capability at a highlight portion has been improved.

As described above, according to the present embodiment, an image signal is inputted as 8-bit representation signal where one pixel is represented by 8 bits, and at processing in the image signal processor immediately before outputting a final image signal to the PWM 26, the number of tonality levels is increased to "1024" (10-bit representation). This improvement of tonality representation capability of laser output improves tonality representation capability at a highlight portion. Accordingly, occurrence of pseudo outline upon image formation can be prevented, and tonality representation capability is greatly improved.

Note that the above embodiment improves representation capability at a highlight portion upon image formation by increasing the number of tonality levels of laser output, however, this does not pose any limitation on the present invention. Generally, the human eye has high sensitivity at a highlight portion, while a low sensitivity at a shadow portion; for example, the sensitivity at density level "200" is ⅕ or less than the sensitivity at density level "10". Accordingly, considering that upon image formation, tonality representation capability at a highlight portion is very important but tonality representation capability at a shadow portion is of less importance, the number of tonality levels at a shadow portion may be reduced while the number of tonality levels at a highlight portion may be increased, by changing the shape of triangular wave for pulse-width modulation.

Figure 18:
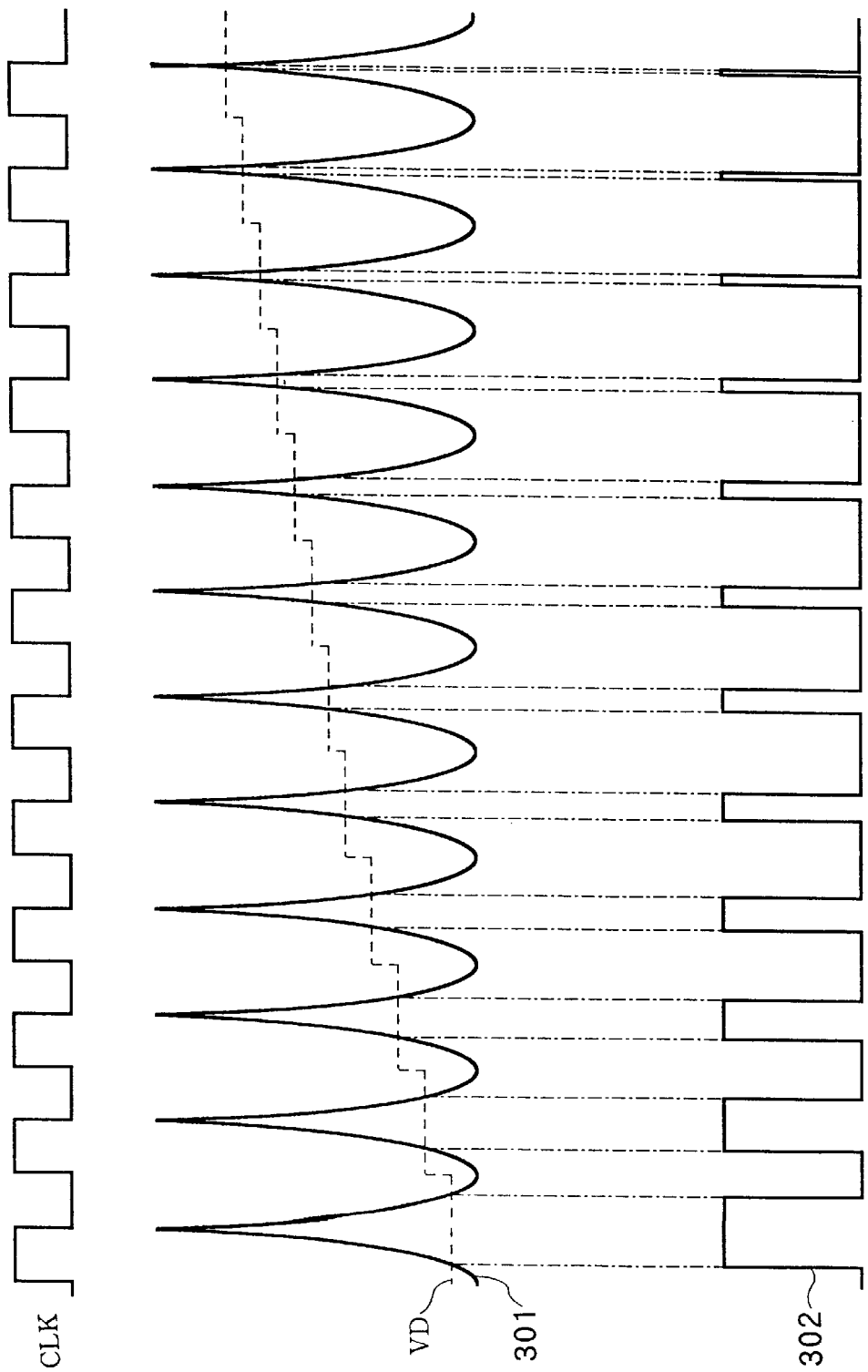
FIG. 18 is a timing chart showing various signals in a case where a pulse-width modulated signal is generated by performing pulse-width modulation using a signal having a waveform of a rectified sine wave.

FIG. 18 is a timing chart showing various signals in a case where a pulse-width modulated signal 302 is generated in the PWM 26 by performing pulse-width modulation using a signal having a waveform of a rectified sine wave 301 instead of a triangular wave.

Figure 19:
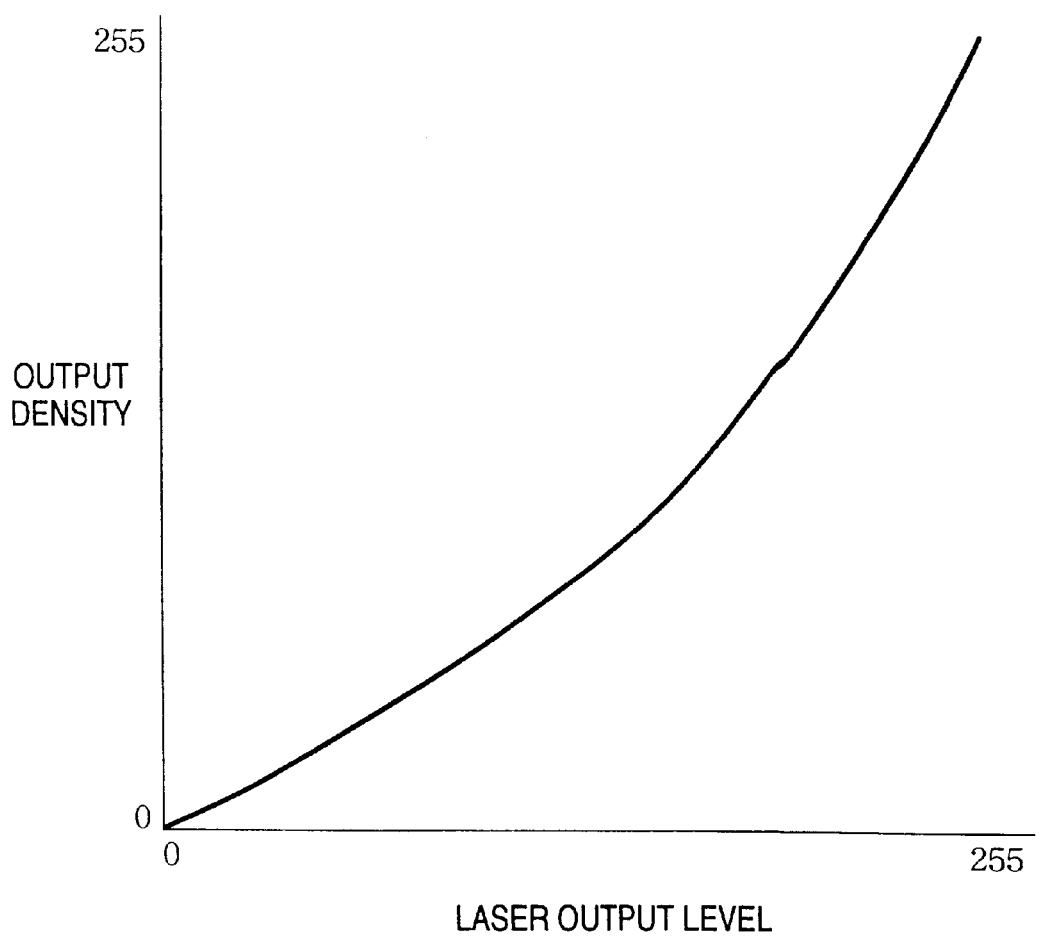
FIG. 19 is a line graph showing a printer characteristic representing the relation between output densities and laser output levels in case of pulse-width modulation in FIG. 18.
Figure 20:
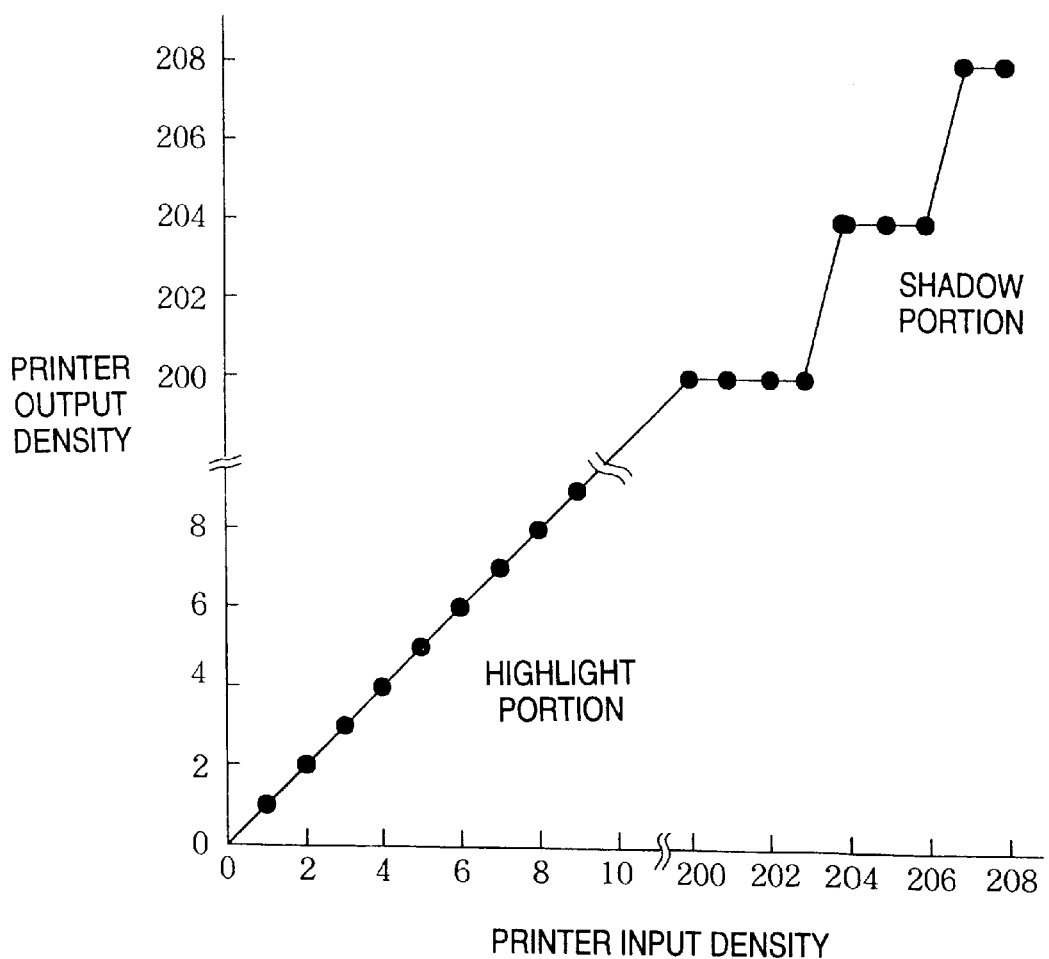
FIG. 20 is a line graph showing an LUT characteristic having high tonality representation capability at a highlight portion (low density portion) and low tonality representation capability at a shadow portion (high density portion)

In this pulse-width modulation, a printer characteristic represented as the relation between output densities to the PWM 26 and laser output levels has an upward concave curve as shown in FIG. 19. When this printer characteristic is corrected to a linear characteristic by using an LUT, the LUT has a high tonality representation capability at a highlight portion and a low tonality representation capability at a shadow (high-density) portion, as shown in FIG. 20. This increases the number of levels at a highlight portion, which is the most important in image formation, prevents occurrence of a pseudo outline, and improves tonality representation capability at a highlight portion.

The above embodiment has been described for a color copying machine as a representative embodiment, however, the present invention is not limited to a color copying machine. The present invention is applicable to a monochromatic copying machine, as shown in FIG. 21, so as to form a monochrome image with an excellent tonality representation at a highlight portion.

Figure 21:
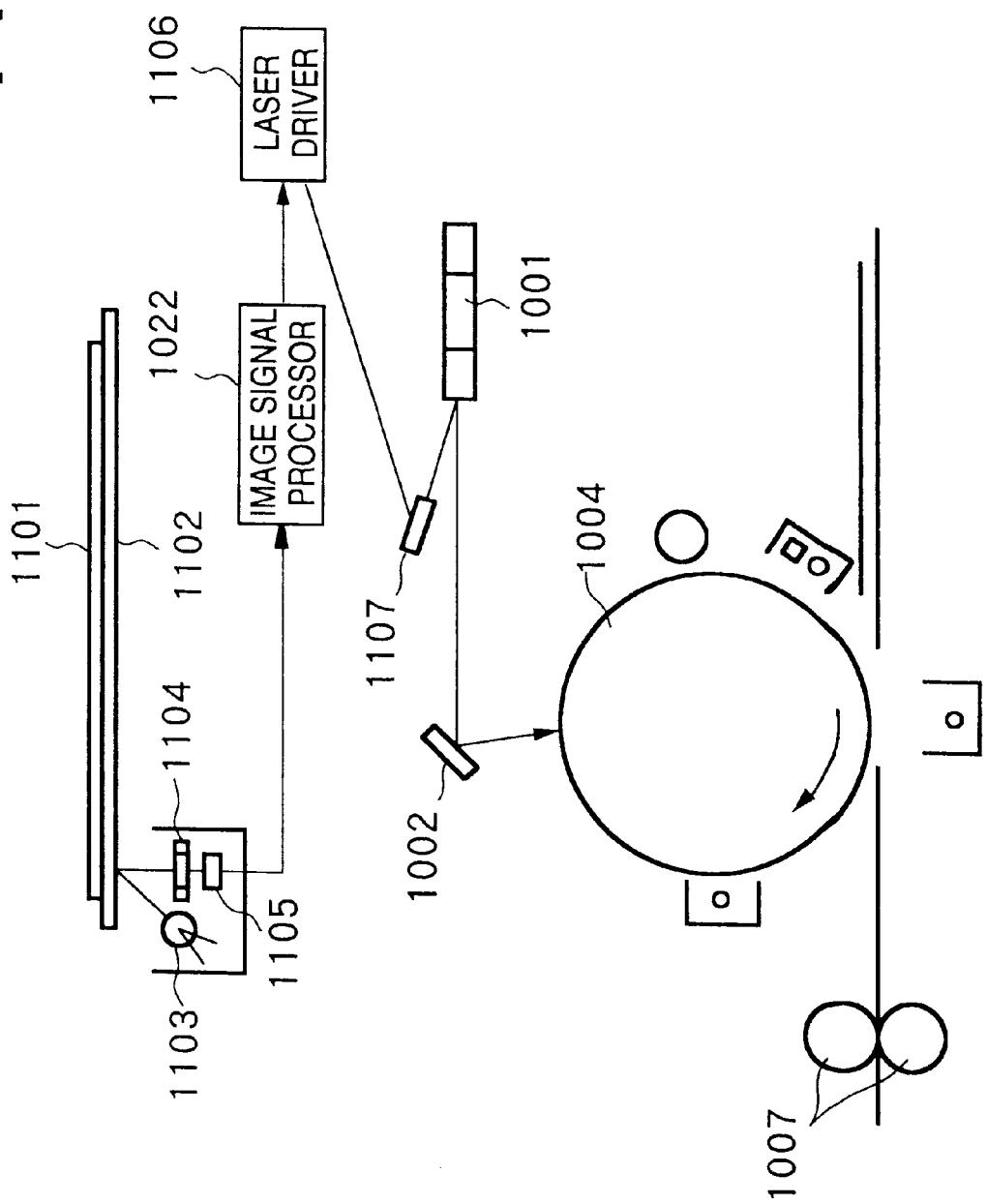
FIG. 21 is a cross-sectional side view showing the schematic structure of a monochromatic copying machine.

Since the structure in FIG. 21 is basically the same as that in FIG. 1, the elements corresponding to those in FIG. 1 have the same reference numerals. Note that the structure in FIG. 21 lacks a transfer drum because monochrome image formation does not require multiple transfer of color toner images. In FIG. 21, numeral 1102 denotes a platen; and 1022, an image signal processor having almost the same construction as that shown in FIG. 2 except color image formation.

The above embodiments have been described as color copying machine and monochromatic copying machine as representative embodiments, however, the present invention is not limited to copying machines. For example, the present invention is applicable to a printer apparatus which has interface for receiving image from a host computer. In such case, the printer receives image data generated by the host computer via the interface, instead of obtaining image data by reading an original image, and performs image formation based on the received image data.

The present invention can be applied to a system constituted by a plurality of devices such as a host computer, an interface unit, printer etc., or to an apparatus comprising a single device such as a copier. Furthermore, the invention is applicable also to a case where the object of the invention is attained by supplying a program to a system or apparatus, a storage medium, storing a program according to the invention, constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   input means for inputting multivalued image data capable of m-level representation;
   processing means for performing image processing on the multivalued image data inputted by said input means;
   conversion means for converting the multivalued image data image-processed by said processing means into multivalued image data capable of n-level representation, such that the number of tonality levels n is greater than the number of tonality levels m; and
   image formation means for performing image formation based on the multivalued image data capable of n-level representation,
   wherein said conversion means converts the multivalued image data such that the difference between an image density D(x) of an image formed on the print medium at a tonality level x and an image density D(x+1) of an image formed on the print medium at a next tonality level x+1 satisfies $$D(x+1)-D(x) \leq A(D(x))(A \leq 0.08, D(x) > 0.08).$$

2. The image processing apparatus according to claim 1, wherein said image formation means generates a pulse-width modulation signal by comparing the multivalued image data outputted from said conversion means with a pattern signal of a predetermined period.

3. The image processing apparatus according to claim 1, wherein the multivalued image data inputted by said input means is brightness data, and wherein said processing means converts the brightness data having m levels into density data having m levels.

4. The image processing apparatus according to claim 3, wherein said processing means performs γ correction.

5. The image processing apparatus according to claim 3, wherein said processing means performs edge enhancement.

6. The image processing apparatus according to claim 3, wherein said processing means performs smoothing.

7. The image processing apparatus according to claim 1, wherein said conversion means converts density data having m levels into density data having n levels.

8. The image processing apparatus according to claim 7, wherein a conversion characteristic of said conversion means has high representation capability with respect to density data having a relatively low density level, and has low representation capability with respect to density data having a relatively high density level.

9. The image processing apparatus according to claim 8, wherein said conversion means uses a look-up table.

10. The image processing apparatus according to claim 9, wherein the conversion characteristic of said conversion means is represented by a quadric curve as the relation between density data inputted to said conversion means and density data outputted from said conversion means.

11. The image processing apparatus according to claim 1, wherein an image formation characteristic of said image formation means is represented by a quadric curve as the relation between density data inputted to said image formation means and density data outputted from said image formation means.

12. The image processing apparatus according to claim 11, wherein with respect to representation based on density data having a relatively low density level, the image formation characteristic represented by the quadric curve is determined in consideration of density discrimination ability of human eye.

13. The image processing apparatus according to claim 1, wherein the multivalued image data inputted by said input means is color image data.

14. The image processing apparatus according to claim 13, wherein the color image data comprises of multivalued R, G and B component data.

15. The image processing apparatus according to claim 1, wherein said input means includes reading means for reading the multivalued image data.

16. The image processing apparatus according to claim 1, wherein said image formation means performs image formation in accordance with an electrophotographic method.

17. An image processing apparatus comprising:
    input means for inputting multivalued image data capable of m-level representation; and
    image formation means for forming an image on a print medium based on the multivalued image data,
    wherein said image formation means forms an image such that the difference between an image density D(x) of the image formed on the print medium at a tonality level x and an image density D(x+1) of an image formed on the print medium at a next tonality level x+1 satisfies $$D(x+1)-D(x) \leq A(D(x))(A \leq 0.08, D(x) > 0.08).$$

18. The image processing apparatus according to claim 20, wherein an image formation characteristic of said image formation means is represented by a quadric curve as the relation between density data inputted to said image formation means and density data outputted from said image formation means.

19. The image processing apparatus according to claim 17, wherein said input means includes reading means for reading an image original and generating the image data.

20. The image processing apparatus according to claim 17, wherein said image formation means performs image formation in accordance with an electrophotographic method.

21. The image processing apparatus according to claim 18, wherein said image formation means includes modulation means for performing pulse-width modulation on the image data inputted by said input means, based on a pattern signal having a rectified sine wave having a predetermined period.

22. The apparatus according to claim 17, wherein the image data is color image data.

23. An image processing apparatus comprising:
    input means for inputting image data;
    modulation means for generating a pulse-width modulated signal based on the image data,
    wherein the pulse-width modulated signal is generated such that a difference between a pulse width of a pulse-width modulated signal corresponding to a density value of the image data and that corresponding to a next-greater density value of the image data in a high density area of an image is greater than that in a low density area of the image.

24. The image processing apparatus according to claim 23, further comprising image formation means for forming an image based on the pulse-width modulated signal, wherein an image formation characteristic of said image formation means is represented by a quadric curve as the relation between density data inputted to said image formation means and density data outputted from said image formation means.

25. The image processing apparatus according to claim 23, wherein the image data is color image data.

26. An image processing method comprising:

an input step of inputting multivalued image data capable of m-level representation;

a processing step of performing image processing on the multivalued image data inputted at said input step;

a conversion step of converting the multivalued image data image-processed at said processing step into multivalued image data capable of n-level representation, such that the number of tonality levels n is greater than the number of tonality levels m; and an image formation step of performing image formation based on the multivalued image capable of n-level representation, wherein said conversion step converts the multivalued image data such that the difference between an image density $D(x)$ of an image formed on a print medium at a tonality level x and an image density $D(x+1)$ of an image formed on the print medium at a next tonality level x+1 satisfies $$D(x+1)-D(x) \leq A(D(x)) (A \leq 0.08, D(x) > 0.08).$$

27. An image processing method comprising:

an input step of inputting multivalued image data capable of m-level representation; and an image formation step of forming an image on a print medium based on the multivalued image data, wherein at said image formation step, an image is formed such that the difference between an image density $D(x)$ of the image formed on the print medium at a tonality level x and an image density $D(x+1)$ of an image formed on the print medium at a next tonality level x+1 satisfies $$D(x+1)-D(x) \leq A(D(x)) (A \leq 0.08, D(x) > 0.08).$$

28. An image processing method comprising:

an input step of inputting image data; and a modulation step of generating a pulse-width modulated signal based on the image data, wherein the pulse-width modulated signal is generated such that a difference between a pulse width of the pulse-width modulated signal corresponding to a density value of the image data and that corresponding to a next-greater density value of the image data in a high density area of an image is greater than that in a low density area of the image.

29. The apparatus according to claim 23, wherein said modulation means includes pattern-signal generation means for generating a pattern signal having a rectified sine wave having a predetermined period, and said modulation means performs pulse-width modulation by using the pattern signal.

30. The apparatus according to claim 23, wherein said input means includes reading means for reading an image original and generating the image data.

* * * * *

UNITED STATES PATENT AND TRADEMARK OFFICE
CERTIFICATE OF CORRECTION

PATENT NO.  : 6,057,946
DATED       : May 2, 2000
INVENTOR(S) : Ikeda et al.

Page 1 of 2

COLUMN 5:

Line 15, "a" (second occurrence) should read --$\underline{a}$--.

COLUMN 6:

Lines 41 to 42, "$\begin{bmatrix} G_o \\ B_o \end{bmatrix} = \begin{bmatrix} a_{21} & a_{22} & a_{23} \\ a_{31} & a_{32} & a_{33} \end{bmatrix} \begin{bmatrix} G_i \\ B_i \end{bmatrix}$" should read --$\begin{bmatrix} R_o \\ G_o \\ B_o \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R_i \\ G_i \\ B_i \end{bmatrix}$--.

UNITED STATES PATENT AND TRADEMARK OFFICE
CERTIFICATE OF CORRECTION

PATENT NO. : 6,057,946

DATED : May 2, 2000

INVENTOR(S) : Ikeda et al.

Page 2 of 2

<u>COLUMN 12</u>

Line 37, "20," should read --17,--; and
Line 58, "data;" should read --data; and--.

Signed and Sealed this

Fifteenth Day of May, 2001

Attest:

NICHOLAS P. GODICI

*Attesting Officer*     *Acting Director of the United States Patent and Trademark Office*